(12) United States Patent
Ukai et al.

(10) Patent No.: US 10,353,667 B2
(45) Date of Patent: Jul. 16, 2019

(54) INFORMATION CONVERSION METHOD AND INFORMATION PROCESSING APPARATUS

(71) Applicant: FUJITSU LIMITED, Kawasaki-shi, Kanagawa (JP)

(72) Inventors: Takanori Ukai, Chofu (JP); Shohei Yamane, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 77 days.

(21) Appl. No.: 15/285,017

(22) Filed: Oct. 4, 2016

(65) Prior Publication Data

US 2017/0109133 A1 Apr. 20, 2017

(30) Foreign Application Priority Data

Oct. 16, 2015 (JP) .................. 2015-205019

(51) Int. Cl.
  *G06F 5/00* (2006.01)
  *G06F 15/02* (2006.01)
(52) U.S. Cl.
  CPC ............ *G06F 5/00* (2013.01); *G06F 15/0258* (2013.01)
(58) Field of Classification Search
  CPC .......................................................... G06F 5/00
  USPC ........................................................ 702/198
  See application file for complete search history.

(56) References Cited

U.S. PATENT DOCUMENTS

| 8,314,793 B2 | 11/2012 | Beckman et al. |
| 9,565,067 B1 * | 2/2017 | Aberg ....................... G06F 8/34 |
| 2005/0080755 A1 * | 4/2005 | Aoyama ........... G06F 17/30569 |
| 2013/0262488 A1 * | 10/2013 | Shirakawa ........ G06F 17/30386 |
| | | 707/756 |
| 2015/0019799 A1 * | 1/2015 | Higo .................... G11C 7/1006 |
| | | 711/103 |
| 2016/0246809 A1 * | 8/2016 | Romano ........... G06F 17/30563 |

FOREIGN PATENT DOCUMENTS

| JP | 2005-25654 A | 1/2005 |
| JP | 2012-191825 A | 10/2012 |

OTHER PUBLICATIONS

Office Action dated Jun. 4, 2019, issued in counterpart JP Application No. 2015-205019, with English machine translation. (13 pages).

* cited by examiner

*Primary Examiner* — Ricky Ngon

(74) *Attorney, Agent, or Firm* — Westerman, Hattori, Daniels & Adrian, LLP

(57) ABSTRACT

An information processing apparatus includes a memory and a processor. The processor is configured to receive an input physical quantity, a value of the input physical quantity, and an output physical quantity. The processor is configured to generate a first array of first conversion operations or a second array of second conversion operations by using conversion rules each for converting a value of a source physical quantity into a value of a target physical quantity. Each conversion operation is a conversion according to a conversion rule or a reverse operation thereof. The first array enables a conversion of the input physical quantity into the output physical quantity. The second array enables the reverse. The processor is configured to convert the received value of the input physical quantity into a value of the output physical quantity by using the first array or the second array.

12 Claims, 22 Drawing Sheets

FIG. 3

| ID | CONVERSION-SOURCE PHYSICAL QUANTITY | CONVERSION-SOURCE UNIT | COEFFICIENT | CALCULATION | CONVERSION-TARGET PHYSICAL QUANTITY | CONVERSION-TARGET UNIT |
|---|---|---|---|---|---|---|
| 1 | AMOUNT OF $CO_2$ GENERATED | t | 3 | * | AMOUNT OF GASOLINE BURNED | l |
| 2 | AMOUNT OF GASOLINE BURNED | l | 4 | * | ENERGY | kcal |
| 3 | DISTANCE VEHICLE TRAVELS | km | 0.05 | * | AMOUNT OF GASOLINE BURNED | l |
| 4 | ENERGY | kcal | 0.5 | * | NUMBER OF PERSON'S STEPS | step |

32

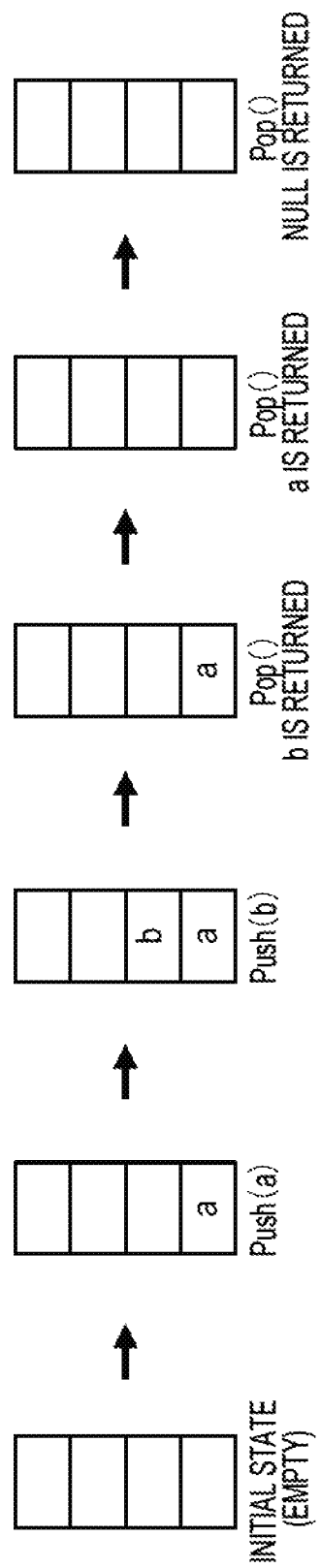

FIG. 12

| ID | CONVERSION-SOURCE UNIT | COEFFICIENT | CALCULATION | CONVERSION-TARGET UNIT |
|---|---|---|---|---|
| K1 | kcal | 1000 | * | cal |
| K2 | t | 1000000 | * | g |
| K3 | in. | 2.54 | * | cm |

FIG. 17

| ID | CONVERSION-SOURCE PHYSICAL QUANTITY | CONVERSION-SOURCE UNIT | COEFFICIENT | CALCULATION | CONVERSION-TARGET PHYSICAL QUANTITY | CONVERSION-TARGET UNIT |
|---|---|---|---|---|---|---|
| 1 | AMOUNT OF $CO_2$ GENERATED | t | 3 | * | AMOUNT OF GASOLINE BURNED | l |
| 2 | AMOUNT OF GASOLINE BURNED | l | 4 | * | ENERGY | kcal |
| 3 | DISTANCE VEHICLE TRAVELS | km | 0.05 | * | AMOUNT OF GASOLINE BURNED | l |
| 4 | ENERGY | cal | 0.0005 | * | NUMBER OF PERSON'S STEPS | step |

INFORMATION CONVERSION METHOD AND INFORMATION PROCESSING APPARATUS

CROSS-REFERENCE TO RELATED APPLICATION

This application is based upon and claims the benefit of priority of the prior Japanese Patent Application No. 2015-205019, filed on Oct. 16, 2015, the entire contents of which are incorporated herein by reference.

FIELD

The embodiments discussed herein are related to an information conversion method and an information processing apparatus.

BACKGROUND

There is a technique for converting a value of one physical quantity (an input physical quantity) into a value of another physical quantity (output physical quantity). For example, a technique has been proposed in which a value of an input physical quantity such as electric power, energy, or the like into an output physical quantity, for example, a physical quantity desired by a user, based on a pre-defined rule for conversion between physical quantities.

This allows a user to intuitively determine a value of a physical quantity which is difficult for the user to intuitively determine.

Related techniques are disclosed in, for example, Japanese Laid-open Patent Publication No. 2012-191825 and Japanese Laid-open Patent Publication No. 2005-25654.

When an input physical quantity is converted into an output physical quantity on the basis of a pre-defined conversion rule, as in the related art noted above, there is a problem in that the physical quantity is not converted when a corresponding conversion rule does not exist.

In particular, physical quantities into which users desire to convert are diverse, and thus when an output physical quantity is a physical quantity desired by a user, it is highly likely that there is no conversion rule for directly converting an input physical quantity into the output physical quantity. Even when available conversion rules are simply combined together, it may be difficult to convert the input physical quantity into the output physical quantity.

SUMMARY

According to an aspect of the present invention, provided is an information processing apparatus including a memory and a processor. The processor is coupled with the memory. The processor is configured to receive an input physical quantity, a value of the input physical quantity, and an output physical quantity. The processor is configured to generate a first array of first conversion operations or a second array of second conversion operations by using conversion rules each for converting a value of a source physical quantity into a value of a target physical quantity. Each of the first conversion operations and the second conversion operations is an operation of a conversion according to any one of the conversion rules or a reverse operation of a conversion according to any one of the conversion rules. The first array includes conversion operations through which a value of the input physical quantity is converted into a value of the output physical quantity. The second array includes conversion operations through which a value of the output physical quantity is converted into a value of the input physical quantity. The processor is configured to convert the received value of the input physical quantity into a value of the output physical quantity by using the first array or the second array.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a physical-quantity conversion table according to the first embodiment;

FIG. 8 is a diagram illustrating a stack structure;

FIG. 12 illustrates an example of a unit conversion table according to the second embodiment;

FIG. 17 illustrates an example of a physical-quantity conversion table according to the second embodiment;

DESCRIPTION OF EMBODIMENTS

Embodiments of the technique according to the present disclosure will be described below in detail with reference to the accompanying drawings.

First Embodiment

Figure 1:
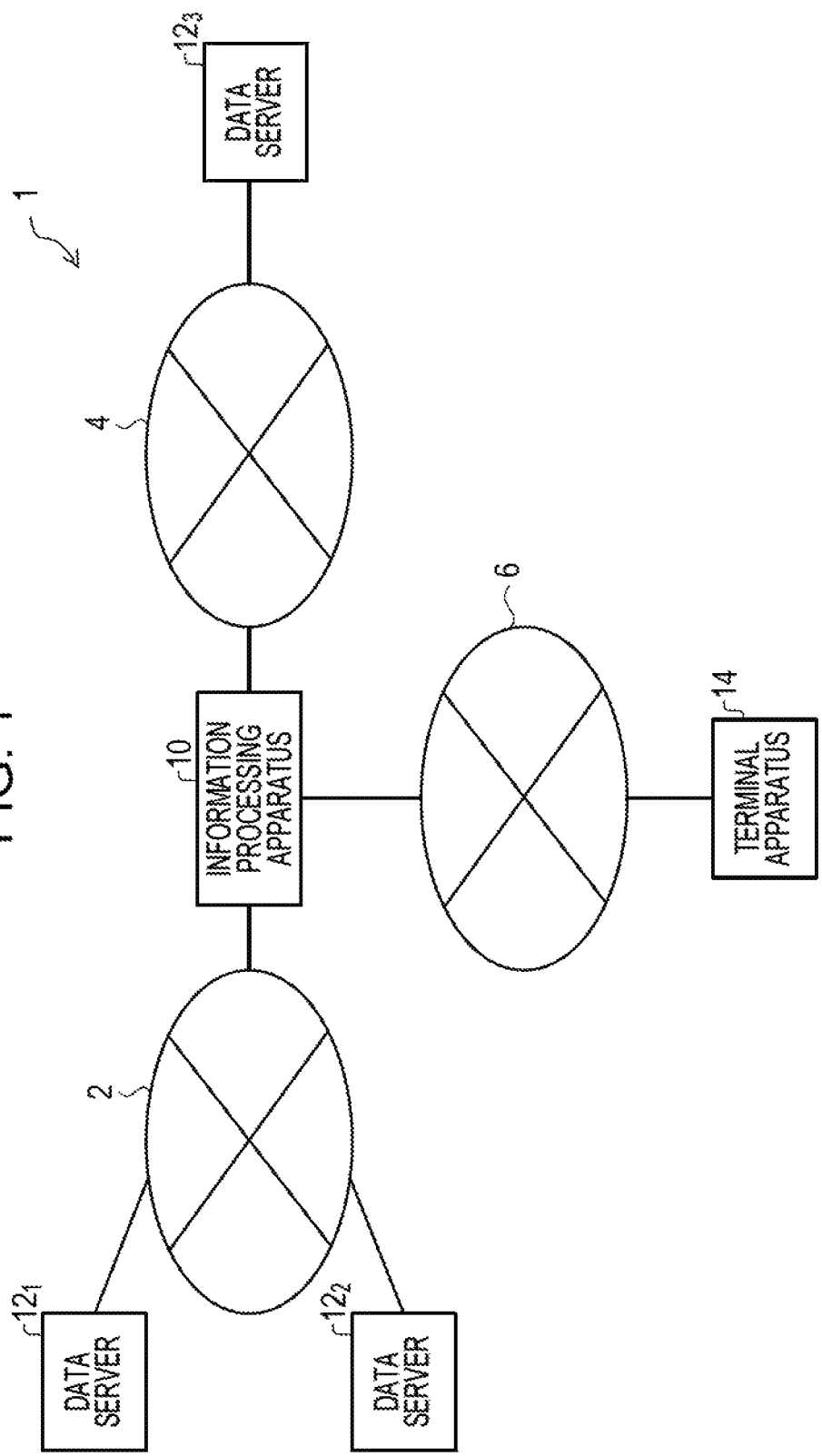
FIG. 1 is a diagram illustrating an exemplary configuration of an information processing system according to a first embodiment.

As illustrated in FIG. 1, an information processing system 1 according to a first embodiment includes an information processing apparatus 10, data servers $12_1$, $12_2$, and $12_3$, and a terminal apparatus 14. When the data servers $12_1$, $12_2$, and $12_3$ are collectively referred without distinction therebetween, they are referred to as data servers 12 without reference numerals for distinguishing the individual data servers. As illustrated in FIG. 1, in the present embodiment, the information processing apparatus 10, the data server $12_1$, and the data server $12_2$ are coupled with each other through a network 2 so that information may be exchanged between them. The information processing apparatus 10 and the data server $12_3$ are coupled with each other through a network 4 so that information may be exchanged between them. In addition, the information processing apparatus 10 and the terminal apparatus 14 are coupled with each other through a network 6 so that information may be exchanged between them.

Upon receiving, from the terminal apparatus 14, an instruction for converting (physical-quantity conversion) a value of one physical quantity (input physical quantity) into a value of another physical quantity (output physical quantity, for example, a physical quantity desired by a user) different from the one physical quantity, the information processing apparatus 10 performs physical-quantity conversion.

The information processing apparatus 10 obtains, from the data servers 12, conversion rules for performing the physical-quantity conversion. The data servers 12 are not particularly limited, and are, for example, web servers.

When receiving the instruction for the physical-quantity conversion, the information processing apparatus 10 receives, from the terminal apparatus 14, the input physical quantity, the value (a numerical value and a unit) of the input physical quantity, and the output physical quantity. The terminal apparatus 14 is not particularly limited and may be, for example, a desktop or laptop personal computer or a portable information terminal device called a personal digital assistant (PDA) such as a tablet terminal or a smartphone.

Figure 2:
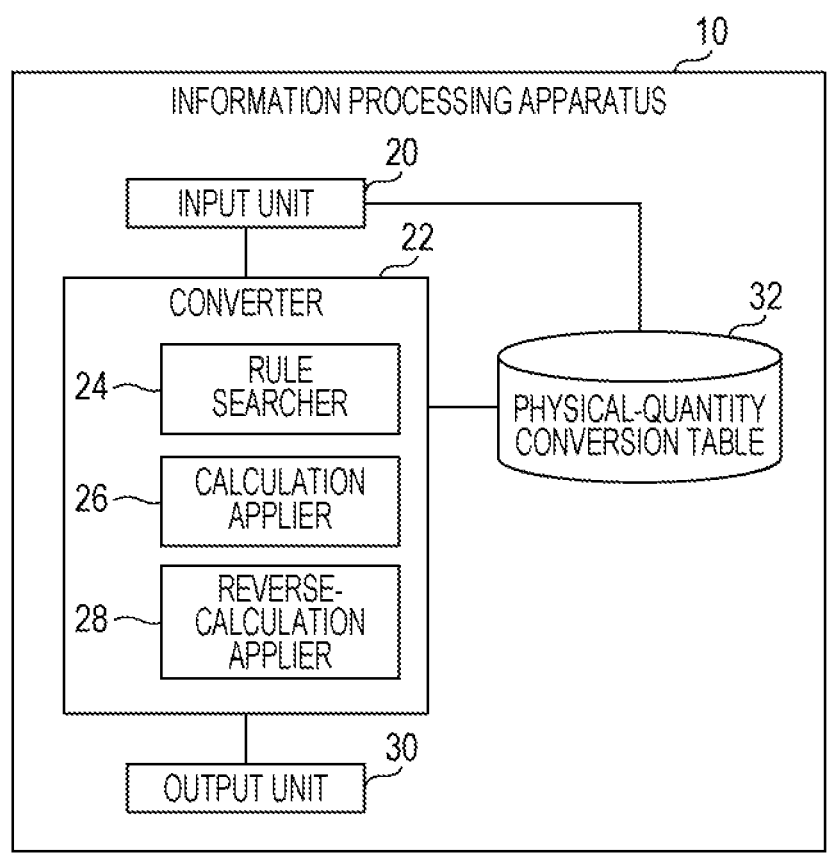
FIG. 2 is a diagram illustrating an exemplary configuration of an information processing apparatus according to the first embodiment.

As illustrated in FIG. 2, the information processing apparatus 10 according to the present embodiment includes an input unit 20, a converter 22, and an output unit 30. A physical-quantity conversion table 32 is stored in a predetermined storage area (a physical-quantity conversion table storage area 72 in FIG. 4) provided in the information processing apparatus 10.

A conversion rule obtained from the data server 12 is input to the input unit 20. The input unit 20 assigns an identification (ID) to the input conversion rule, and the conversion rule is stored in the physical-quantity conversion table 32. As illustrated in FIG. 3, each conversion rule stored in the physical-quantity conversion table 32 defines a relationship between a value of a conversion-source physical quantity represented in a conversion-source unit and a value of a conversion-target physical quantity represented in a conversion-target unit. In the present embodiment, a value of a physical quantity is represented by a combination of a numerical value (hereinafter referred to as "amount") and a unit. For example, when a value of a physical quantity is "3 t", this is a combination of an amount "3" and a unit "t".

As illustrated in FIG. 3, specifically, one conversion rule includes a conversion-source physical quantity, a unit (hereinafter referred to as a "conversion-source unit") in which a value of the conversion-source physical quantity is represented, a coefficient, a calculation method ("calculation" in FIG. 3), a conversion-target physical quantity, and a unit (hereinafter referred to as a "conversion-target unit") in which a value of the conversion-target physical quantity is represented. For example, the conversion rule with ID=1 illustrated in FIG. 3 indicates that the value "1 t" of the physical quantity "amount of $CO_2$ generated" is converted into a value "3 l" (1×3=3) of the physical quantity "amount of gasoline burned".

An input physical quantity, a value (an amount and a unit) of the input physical quantity, and an output physical quantity are input to the input unit 20 from the terminal apparatus 14. The value of the input physical quantity is represented by a combination of a numerical value (amount) and a unit, as described above.

The converter 22 includes a rule searcher 24, a calculation applier 26, and a reverse-calculation applier 28. The rule searcher 24 according to the present embodiment searches the physical-quantity conversion table 32 for a conversion rule with which a conversion (forward conversion) according to the conversion rule may be used in course of conversion of the input physical quantity into the output physical quantity. The rule searcher 24 also searches the physical-quantity conversion table 32 for a conversion rule with which a reverse conversion (reverse calculation) of a conversion according to the conversion rule may be used in course of conversion of the input physical quantity into the output physical quantity. The "reverse conversion" as used herein refers to a conversion in which a conversion-source physical quantity and a conversion-target physical quantity in a conversion rule are exchanged with each other. For example, a reverse conversion of a conversion according to the conversion rule with ID=1 illustrated in FIG. 3 is a conversion of the value "1 l" of the physical quantity "amount of gasoline burned" into a value "⅓ t" of the physical quantity "amount of $CO_2$ generated".

The calculation applier 26 performs physical-quantity conversion by applying the conversion rule for which the rule searcher 24 determined that the conversion according to the conversion rule may be used. More specifically, the calculation applier 26 performs a physical-quantity conversion by performing a calculation defined by the conversion rule.

The reverse-calculation applier 28 performs physical-quantity conversion by applying the reverse conversion of a conversion according to the conversion rule for which the rule searcher 24 determined that the reverse conversion thereof may be used. Specifically, the reverse-calculation applier 28 converts the physical quantity by applying a reverse calculation (for example, division in the case of multiplication) of the calculation defined in the conversion rule.

The output unit 30 outputs a result of the physical-quantity conversion performed by the converter 22 to the terminal apparatus 14.

Figure 4:
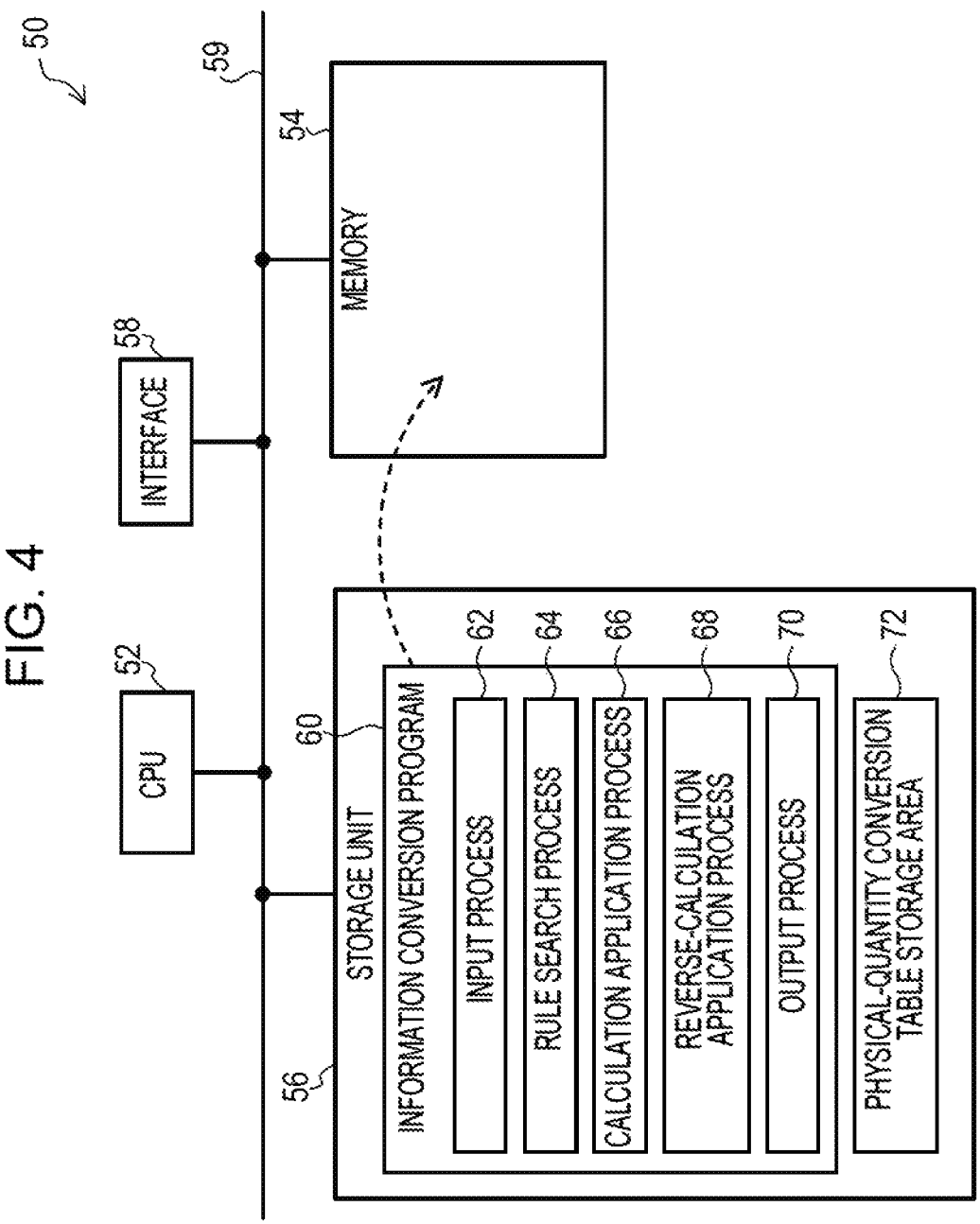
FIG. 4 is a diagram illustrating a configuration of a computer that serves as the information processing apparatus according to the first embodiment.

The information processing apparatus 10 may be implemented by, for example, a computer 50 illustrated in FIG. 4. More specifically, the information processing apparatus 10 may be implemented by the computer 50 that serves as a server. The computer 50 includes a central processing unit (CPU) 52, a memory 54, a nonvolatile storage unit 56, and an interface 58. The CPU 52, the memory 54, the storage unit 56, and the interface 58 are coupled with each other through a bus 59. The data server 12 and the terminal apparatus 14 are coupled with the interface 58.

The storage unit 56 serves as a storage medium and may be implemented by a hard disk drive (HDD), a flash memory, or the like. An information conversion program 60 for causing the computer 50 to serve as the information processing apparatus 10 is stored in the storage unit 56. The CPU 52 reads the information conversion program 60 from the storage unit 56, loads the information conversion program 60 to the memory 54, and performs processes included in the information conversion program 60.

The information conversion program 60 includes an input process 62, a rule search process 64, a calculation application process 66, a reverse-calculation application process 68, and an output process 70. The CPU 52 serves as the input unit 20 by performing the input process 62. The CPU 52 serves as the rule searcher 24 by performing the rule search process 64. The CPU 52 serves as the calculation applier 26 by performing the calculation application process 66. The CPU 52 serves as the reverse-calculation applier 28 by performing the reverse-calculation application process 68. The CPU 52 serves as the output unit 30 by performing the output process 70.

Thus, when the computer 50 executes the information conversion program 60, it serves as the information processing apparatus 10.

The storage unit 56 includes the physical-quantity conversion table storage area 72. The physical-quantity conversion table 32 is stored in the physical-quantity conversion table storage area 72.

The computer 50 is not limited to the so-called desktop personal computer. The computer 50 may be a laptop personal computer, a PDA, or the like.

The information processing apparatus 10 may be implemented by, for example, a semiconductor integrated circuit, more specifically, an application-specific integrated circuit (ASIC) or the like.

Next, a description will be given of behaviors of the information processing apparatus 10 according to the present embodiment.

Figure 5:
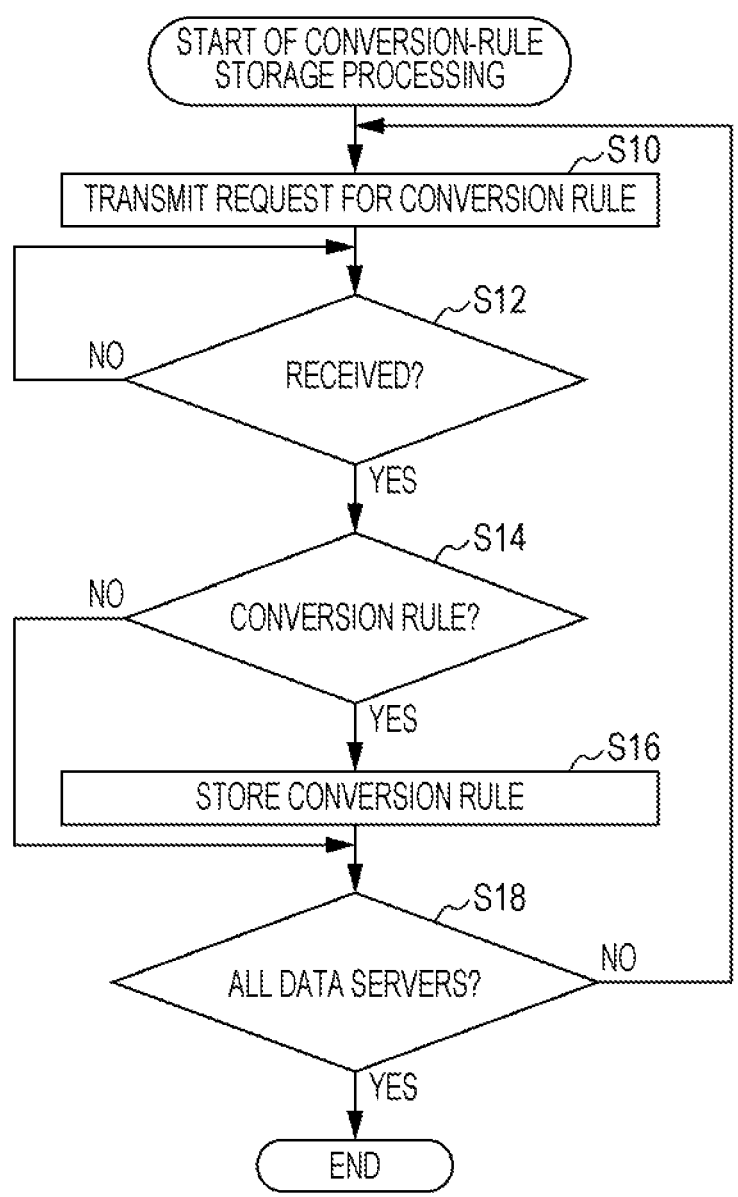
FIG. 5 is a flowchart of an example of conversion-rule storage processing performed by the information processing apparatus according to the first embodiment.

First, a description will be given of processing for storing conversion rules in the physical-quantity conversion table 32 in the information processing apparatus 10. The information processing apparatus 10 according to the present embodiment performs conversion-rule storage processing of obtaining conversion rules from the data servers 12 and pre-storing the conversion rules in the physical-quantity conversion table 32. The conversion-rule storage processing illustrated in FIG. 5 is performed, for example, at a predetermined timing. Examples of the predetermined timing include "at predetermined day intervals", "at predetermined time intervals", or the like.

Figure 6:
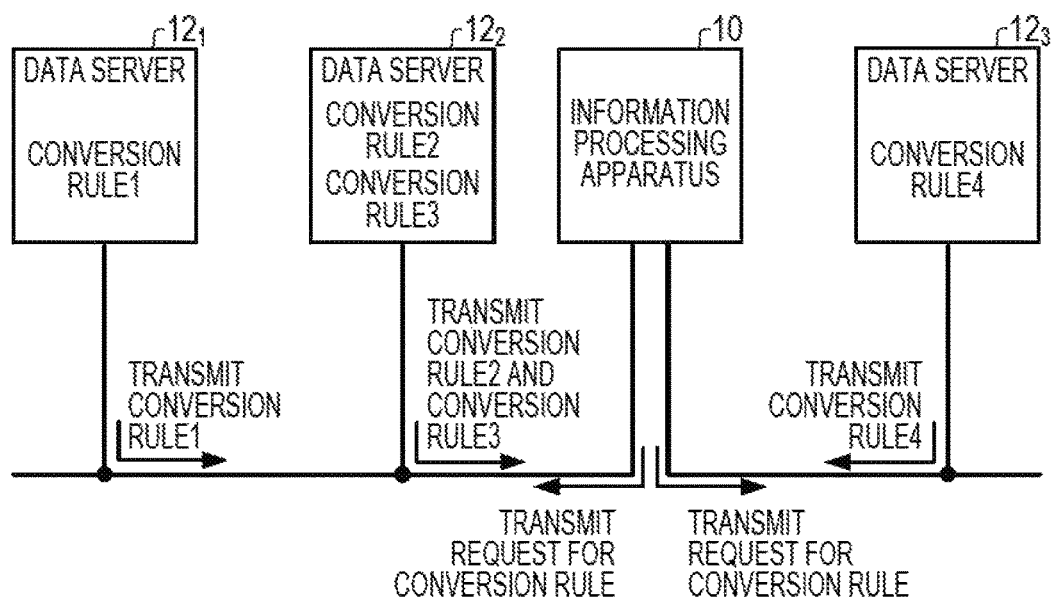
FIG. 6 is a diagram illustrating the conversion-rule storage processing performed by the information processing apparatus according to the first embodiment.

In S10, the rule searcher 24 transmits a request for a conversion rule to one of the data servers 12. In the present embodiment, the data server 12 is assumed to be a web server as a specific example, and the rule searcher 24 pre-holds addresses (for example, uniform resource locators (URLs)) of the individual data servers 12. The rule searcher 24 according to the present embodiment selects one of the addresses of the data servers 12 from the held addresses and issues a request for a conversion rule to the selected data server 12, as illustrated in FIG. 6. If the rule searcher 24 does not pre-hold the addresses of the data servers 12, it may utilize an existing search site or the like to obtain an address of a web server or the like that may be used as a data server 12.

In the present embodiment, when the information processing apparatus 10 issues a request for a conversion rule to the data server 12, the request specifies "a conversion rule for converting a physical quantity", without specifying what physical quantity the conversion rule is related to. A method for issuing the request for the conversion rule is not limited to this method, and the request for the conversion rule may be issued by specifying what physical quantity the conversion rule is related to, for example, by specifying the type of physical quantity or the like.

In response to the request from the information processing apparatus 10, each of the data servers 12 transmits a conversion rule to the information processing apparatus 10. In the example illustrated in FIG. 6, the data server $12_1$ stores a conversion rule1 therein and thus transmits the conversion rule1 to the information processing apparatus 10. Since the data server $12_2$ stores a conversion rule2 and a conversion rule3 therein, it transmits the conversion rule2 and the conversion rule3 to the information processing apparatus 10. Since the data server $12_3$ stores a conversion rule4 therein, it transmits the conversion rule4 to the information processing apparatus 10. The data server 12 that stores no conversion rule therein transmits a response indicating that no conversion rule is stored.

In S12, the rule searcher 24 determines whether or not any information is received from the data server 12 and repeats S12 until the result of the determination becomes affirmative. If the result of the determination in S12 becomes affirmative, the process proceeds to S14 in which the rule searcher 24 determines whether or not the information received from the data server 12 in S12 is a conversion rule. If the received information is not a conversion rule, the result of the determination is negative, and the process proceeds to S18. If a conversion rule is received, the result of the determination is affirmative, and the process proceeds to S16.

In S16, the rule searcher 24 checks whether or not the received conversion rule is already stored in the physical-quantity conversion table 32. If the received conversion rule is not stored yet, the rule searcher 24 assigns an ID to the received conversion rule and stores the conversion rule in the physical-quantity conversion table 32. If the received conversion rule is already stored in the physical-quantity conversion table 32, and only the coefficient differs, there is a possibility that the coefficient within the conversion rule received this time is correct, and thus, only the coefficient may be overwritten. Any ID may be used as long as it identifies an individual conversion rule, and for example, the ID may include a numeric value incremented in order of reception. Also, for example, the ID may include information that makes it possible to identify the data server 12 from which the input physical quantity is transmitted.

In S18, the rule searcher 24 determines whether or not a request for a conversion rule has been issued to all data servers 12 whose addresses are held by rule searcher 24. If the result of the determination in S18 is negative, the process returns to S10, and the above-described processing is repeated.

When some information is received as a result of issuing a request for a conversion rule to all of the data servers 12, the conversion-rule storage processing ends.

Figure 7A:
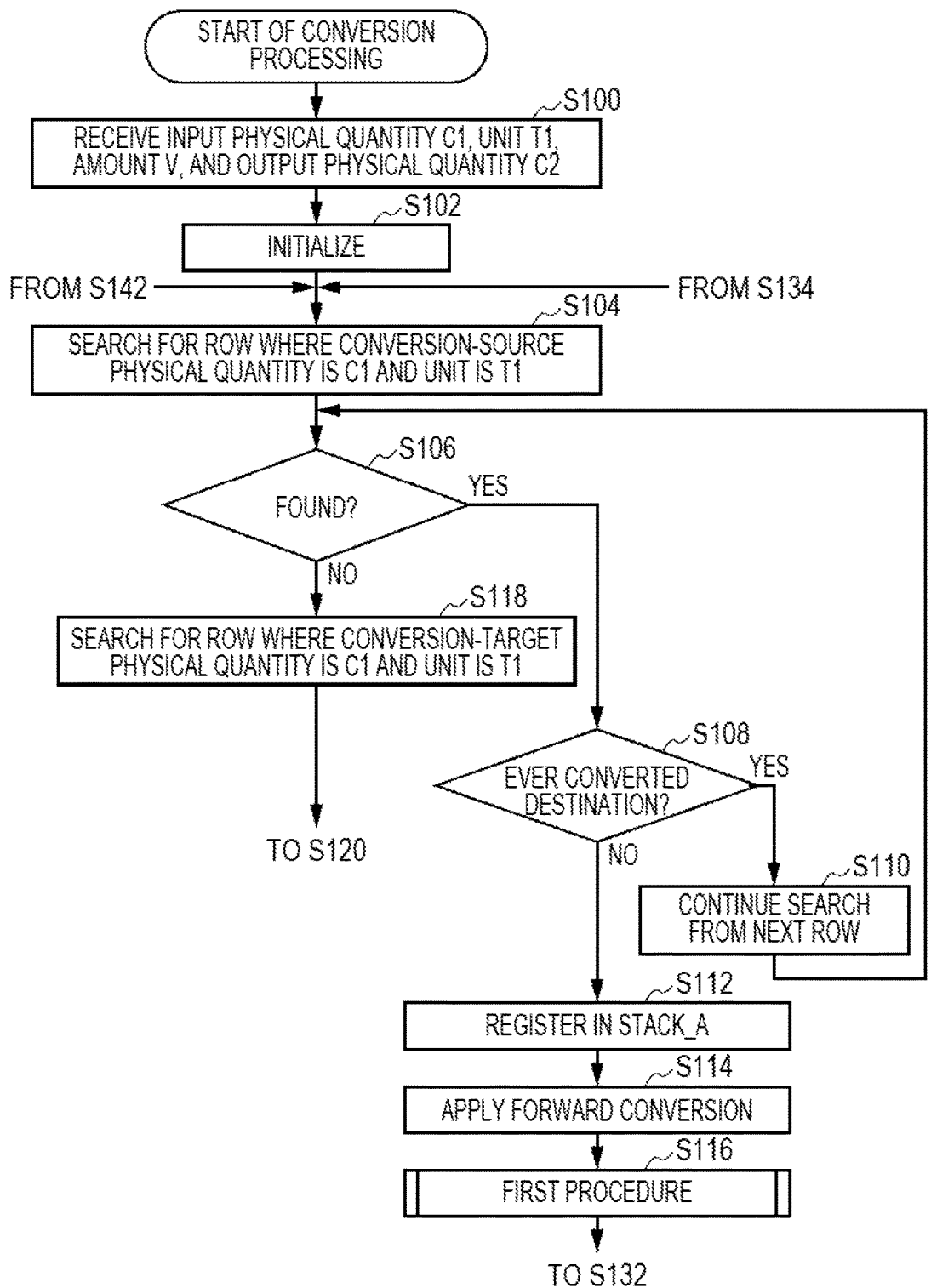
FIGS. 7A and 7B are flowcharts of an example of conversion processing performed by the information processing apparatus according to the first embodiment.
Figure 7B:
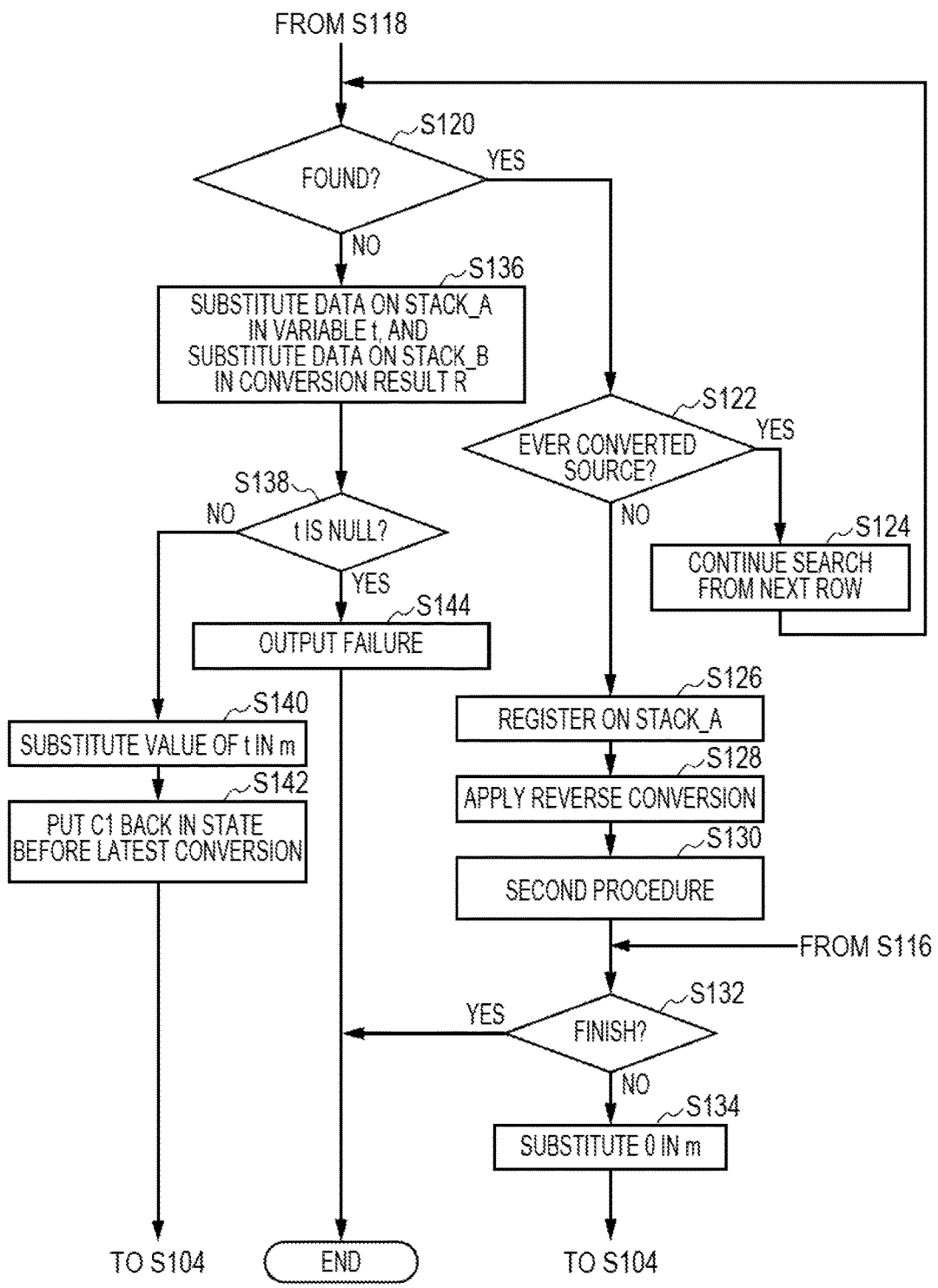

In the state in which the conversion rules are stored in the physical-quantity conversion table 32 in the manner described above, when the information processing apparatus 10 receives an instruction for converting a physical quantity from the terminal apparatus 14, the information processing apparatus 10 performs conversion processing illustrated in FIGS. 7A and 7B.

According to the present embodiment, two stacks (Stack_A and Stack_B), which are last-in first-out (LIFO) memories, are used in the conversion processing. In response to a command "Push", a stack stores data on the top thereof. In response to a command "Pop", the stack returns data stored in the top thereof, that is, most recently stored data. In response to a command "Clear", the stack makes itself empty. In an example of Stack_A illustrated in FIG. 8, Stack_A in an initial state (empty) is prepared. In response to A.Push(a), Stack_A stores data "a" in a first stage thereof. In response to A.Push(b), Stack_A stores data "b" in a second stage thereof. At this state, in response to A.Pop( ), Stack_A returns data "b" from the second stage, which is the top at this point in time. In response to A.Pop( ), Stack_A returns data "a" from the first stage, which is the top at this point in time. When Stack_A becomes empty (that is, a state in which no data is stored in the first stage), in response to A.Pop( ), Stack_A returns NULL indicating that Stack_A is empty.

The row number of a conversion rule applied to a physical-quantity conversion in the conversion processing is stored on Stack_A. The "row" according to the present embodiment refers to a row of the physical-quantity conversion table 32, and in the example in FIG. 3, the ID number matches the row number. A conversion result R indicating an amount of the physical quantity after the conversion, which is obtained by applying the conversion rule stored on Stack_A, is stored on Stack_B.

In S100 of the conversion processing illustrated in FIG. 7A, the input unit 20 receives an input physical quantity C1, an input unit T1, and an amount V from the terminal apparatus 14. Also, the input unit 20 receives an output physical quantity C2 from the terminal apparatus 14.

In S102, the rule searcher 24 initializes the conversion result R of the amount of the physical quantity by using the received amount V. The rule searcher 24 makes Stack_A and stack_B empty to thereby initialize Stack_A and stack_B. The rule searcher 24 initializes, with "0", a row number m of the physical-quantity conversion table 32, which corresponds to a conversion rule to be applied, and starts searching the physical-quantity conversion table 32 for a conversion rule.

In S104, the rule searcher 24 searches, starting from (m+1)-th row, the physical-quantity conversion table 32 for a row where there is a conversion rule in which the conversion-source physical quantity is the input physical quantity C1 and the conversion-source unit is the input unit T1.

In S106, the rule searcher 24 determines whether or not a conversion rule in which the conversion-source physical quantity is the input physical quantity C1 and the conversion-source unit is the input unit T1 is found in the search. If a corresponding conversion rule is found, the result of the determination is affirmative, and the process proceeds to S108.

In S108, the rule searcher 24 determines whether or not the conversion-target physical quantity within the conversion rule extracted in the search is a physical quantity into which a conversion has been performed in a past conversion. When both the forward conversion and the reverse conversion of a conversion according to the conversion rule are used as candidates used for a physical-quantity conversion, a problem as described below occurs. For example, after a forward conversion of a conversion rule for converting a physical quantity A into a physical quantity B is applied to convert the physical quantity A into the physical quantity B, when converting the physical quantity B into the physical quantity A by applying a reverse conversion of a conversion according to the conversion rule is repeated, there is a possibility that the conversion falls into an infinite loop.

Accordingly, the conversion processing according to the present embodiment is adapted so that a physical quantity is not converted again into a physical quantity into which a conversion has been performed in a past conversion, thereby ensuring the conversion of the physical quantity does not fall into an infinite loop.

If the conversion-target physical quantity is a physical quantity into which a conversion has been performed in a past conversion, the result of the determination in S108 is affirmative, and the process proceeds to S110. In S110, the rule searcher 24 resumes the search from the next row (that is, the row next to the row for which it is determined in S106 that a corresponding conversion rule is found), and then the process returns to S106.

If the result of the determination in S108 is negative, the process proceeds to S112. In S112, the rule searcher 24 registers, on Stack_A, the row number m of the row where the conversion rule extracted in the search is stored and information indicating that the forward conversion is applied.

In S114, the calculation applier 26 applies the conversion (forward conversion) according to the extracted conversion rule to the conversion result R to convert the value of the conversion-source physical quantity into the value of the conversion-target physical quantity in the extracted conversion rule. The calculation applier 26 substitutes a result of the conversion in the conversion result R and further registers the conversion result on Stack_B.

Figure 9:
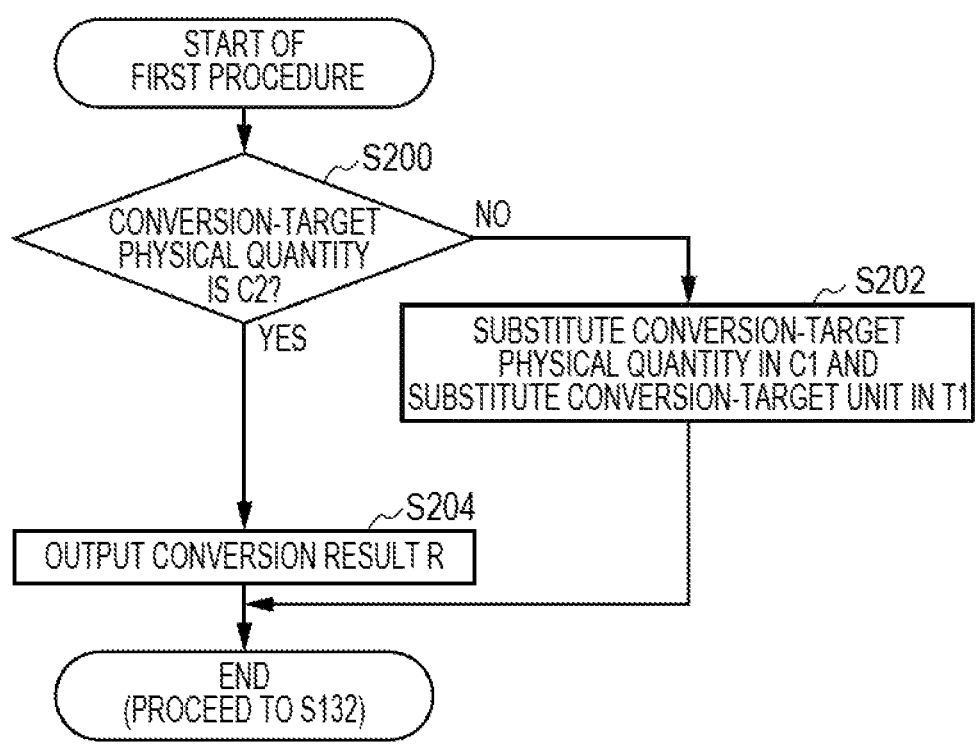
FIG. 9 is a flowchart of an example of a first procedure in the conversion processing according to the first embodiment.

In S116, a first procedure illustrated in FIG. 9 is performed. In S200 in the first procedure illustrated in FIG. 9, the rule searcher 24 determines whether or not the conversion-target physical quantity within the applied conversion rule is the output physical quantity C2. If the conversion-target physical quantity within the applied conversion rule is not the output physical quantity C2, the result of the determination is negative, and the process proceeds to S202.

In S202, the rule searcher 24 substitutes the conversion-target physical quantity within the applied conversion rule in the input physical quantity C1 and substitutes the conversion-target unit in the input unit T1.

If the result of the determination in S200 is affirmative, the process proceeds to S204. In S204, the output unit 30 outputs the conversion result R, which is the result of the conversion performed by the calculation applier 26 in S114 described above, to the terminal apparatus 14 as an output value of the output physical quantity C2. Thereafter, the first procedure ends, and then the process proceeds to S132 in the conversion processing. According to the present embodiment, the output unit 30 also outputs, as a unit (output unit) corresponding to the conversion result R, the unit of the conversion-target physical quantity within the conversion rule applied in the latest calculation, along with the conversion result.

If the result of the determination in S106 is negative, the process proceeds to S118.

In S118, the rule searcher 24 searches for, starting from the (m+1)-th row of the physical-quantity conversion table 32, a conversion rule in which the conversion-target physical quantity is the input physical quantity C1 and the conversion-target unit is the input unit T1.

In S120, the rule searcher 24 determines whether or not a conversion rule in which the conversion-target physical quantity is the input physical quantity C1 and the conversion-target unit is the input unit T1 is found. If a corresponding conversion rule is found, the result of the determination is affirmative, and the process proceeds to S122.

In S122, in order to ensure that the conversion of the physical quantity does not fall into an infinite loop, as in S108 described above, the rule searcher 24 determines whether or not the conversion-source physical quantity within the conversion rule extracted in the search is a physical quantity into which a conversion has been performed in a past conversion.

If the conversion-source physical quantity is a physical quantity into which a conversion has been performed in a past conversion, the result of the determination in S122 is affirmative, and the process proceeds to S124. In S124, the rule searcher 24 resumes the search from the next row (that is, the row next to the row for which it is determined in S120 that a corresponding conversion rule is found), and then the process returns to S120.

If the result of the determination in S122 is negative, the process proceeds to S126. In S126, the rule searcher 24 registers, on Stack_A, the row number m of the row where the conversion rule extracted in the search is stored and information indicating that the reverse conversion is applied.

In S128, the reverse-calculation applier 28 applies the reverse conversion of a conversion according to the extracted conversion rule to the conversion result R to convert the value of the conversion-target physical quantity into the value of the conversion-source physical quantity in the extracted conversion rule. The reverse-calculation applier 28 substitutes a result of the conversion in the conversion result R and further registers the conversion result on Stack_B.

Figure 10:
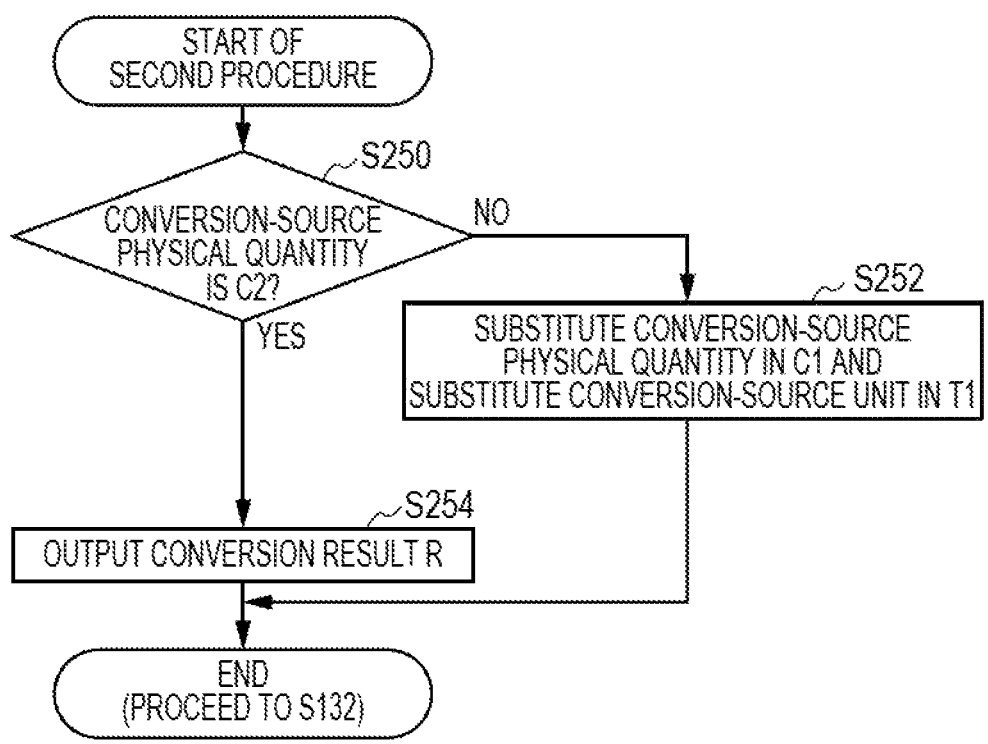
FIG. 10 is a flowchart of an example of a second procedure in the conversion processing according to the first embodiment.

In S130, a second procedure illustrated in FIG. 10 is performed. In S250 in the second procedure illustrated in FIG. 10, the rule searcher 24 determines whether or not the conversion-source physical quantity within the applied conversion rule is the output physical quantity C2. If the conversion-source physical quantity within the applied conversion rule is not the output physical quantity C2, the result of the determination is negative, and the process proceeds to S252.

In S252, the rule searcher 24 substitutes the conversion-source physical quantity within the applied conversion rule in the input physical quantity C1 and substitutes the conversion-source unit in the input unit T1.

If the result of the determination in S250 is affirmative, the process proceeds to S254. In S254, the output unit 30 outputs the conversion result R, which is a result of the conversion performed by the reverse-calculation applier 28 in S128, to the terminal apparatus 14. Thereafter, the second procedure ends, and then the process proceeds to S132 in the conversion processing. According to the present embodiment, the output unit 30 also outputs, as a unit (output unit) corresponding to the conversion result R, the unit of the conversion-source physical quantity within the conversion rule applied in the latest calculation, along with the conversion result.

In S132, the rule searcher 24 determines whether or not to finish the conversion processing. According to the present embodiment, if the conversion result R is output in the first procedure in S116 (see FIG. 9) or the second procedure in S130 (see FIG. 10), the result of the determination is affirmative, and the conversion processing ends.

An array of conversion rules indicated by an array of the row numbers m, which are stored on Stack_A from the bottom thereof, at the time when the value (the amount thereof) of the output physical quantity C2 is output is an example of an array of conversion operations in the disclosed technique.

If the result of the determination in S132 is negative, the conversion into the output physical quantity C2 is not completed, and thus the process proceeds to S134. In S134, the rule searcher 24 substitutes "0" in the row number m in order to repeat the physical-quantity conversion, and then the process returns to S104.

If the result of the determination in S120 is negative, there is no conversion rule in which the current input physical quantity is the conversion-source physical quantity or conversion-target physical quantity, and thus the process proceeds to S136.

In S136, the rule searcher 24 substitutes, in a variable t, data (row number) popped from the top of Stack_A. The rule searcher 24 also substitutes, in the conversion result R, data (conversion result) popped from Stack_B. When the data popped from Stack_B is substituted in the conversion result R, two pieces of data are popped from the top of Stack_B, and the second data (the data popped later) is substituted in the conversion result R. In addition, the data substituted in the conversion result R is registered on (pushed in) Stack_B again.

In S138, the rule searcher 24 determines whether or not the variable t is NULL. That is, the rule searcher 24 determines whether or not Stack_A is empty. If the variable t is not NULL, the result of the determination is negative, and the process proceeds to S140.

In S140, the rule searcher 24 substitutes the value of the variable t in the row number m. In S142, the rule searcher 24 substitutes, in the input physical quantity C1, the physical quantity within the conversion rule stored at the row number m and different from the current input physical quantity C1. The physical quantity that is different from the input physical quantity C1 is the conversion-source physical quantity when the data popped from the top of Stack_A includes data indicating a forward conversion, and is the conversion-target physical quantity when the data popped from the top of Stack_A includes data indicating a reverse conversion. In addition, the conversion-source unit or conversion-target unit corresponding to the input physical quantity C1 is substituted in the input unit T1. Thereafter, the process returns to S104.

If the result of the determination in S138 is affirmative, the process proceeds to S144.

In S144, the output unit 30 transmits, to the terminal apparatus 14, information indicating that the conversion of the input physical quantity into the output physical quantity has failed, and then the conversion processing ends.

As a specific example, a flow of the conversion processing when the information processing apparatus 10 has the physical-quantity conversion table 32 illustrated in FIG. 3 and receives, from the terminal apparatus 14, an instruction for converting an "amount of $CO_2$ generated, 2 t" into a "distance a vehicle travels" will be described below. In the following, rather than describing the conversion processing completely, processes enough to follow the flow will be described as appropriate.

First, in S100, the rule searcher 24 of the information processing apparatus 10 sets the input physical quantity C1 to the "amount of $CO_2$ generated", sets the input unit T1 to "t", sets the amount V to "2", and sets the output physical quantity C2 to the "distance a vehicle travels".

In the search performed in S104, a conversion rule stored in the first row (ID=1) in the physical-quantity conversion table 32 is extracted. Thus, the row number "1" is registered on Stack_A in S112, and in S114, the forward conversion of the conversion rule with ID=1 is applied to perform a calculation. When the conversion rule with ID=1 is applied, the amount of $CO_2$ generated, 2 t, is multiplied by a coefficient "3" and is thus converted into an amount of gasoline burned, 6 l (2×3=6). Thus, "6" is registered on Stack_B as the conversion result R.

In S200 in the first procedure (see FIG. 9) of S116, the conversion-target physical quantity within the conversion rule with ID=1 is the "amount of gasoline burned". Since the output physical quantity C2 is the "distance a vehicle travels", the result of the determination is negative, and thus the process proceeds to S202.

In S202, the rule searcher 24 substitutes the "amount of gasoline burned" in the input physical quantity C1, and substitutes "l" in the input unit T1. Thereafter, the first procedure ends, and the process proceeds to S132 in the conversion processing.

After the result of the determination in S132 becomes negative, "0" is substituted in the row number m in S134, and then the process returns to S104. In S104, the physical-quantity conversion table 32 is searched for a conversion rule in which the conversion-source physical quantity is the "amount of gasoline burned" and the conversion-source unit is the "l".

In the search performed in S104, the conversion rule stored in the second row (ID=2) in the physical-quantity conversion table 32 is extracted. Thus, the row number "2" is registered on Stack_A in S112, and in S114, the forward conversion in the conversion rule with ID=2 is applied to perform a calculation. When the conversion rule with ID=2 is applied, the amount of gasoline burned, 6 l, is multiplied by a coefficient "4" and is thus converted into an energy of 24 kcal (6×4=24). Thus, "24" is registered on Stack_B as the conversion result R.

In S200 in the first procedure (see FIG. 9) of S116, the conversion-target physical quantity within the conversion rule with ID=2 is "energy". Since the output physical quantity C2 is the "distance a vehicle travels", the result of the determination is negative, and thus the process proceeds to S202.

In S202, the rule searcher 24 substitutes the "energy" in the input physical quantity C1, and substitutes "kcal" in the input unit T1. Thereafter, the first procedure ends, and the process proceeds to S132 in the conversion processing.

After the result of the determination in S132 becomes negative, "0" is substituted in the row number m in S134, and then the process returns to S104. In S104, the physical-quantity conversion table 32 is searched for a conversion rule in which the conversion-source physical quantity is the "energy" and the conversion-source unit is the "kcal".

In the search performed in S104, the conversion rule stored in the fourth row (ID=4) in the physical-quantity conversion table 32 is extracted. Thus, the row number "4" is registered on Stack_A in S112, and in S114, the forward conversion in the conversion rule with ID=4 is applied to perform a calculation. When the conversion rule with ID=4 is applied, the energy of 24 kcal is multiplied by a coefficient "0.5" and is thus converted into a number of person's steps, 12 (24×0.5=12). Thus, "12" is registered on Stack_B as the conversion result R.

In S200 in the first procedure (see FIG. 9) in S116, the conversion-target physical quantity within the conversion rule with ID=4 is "number of person's steps". Since the output physical quantity C2 is the "distance a vehicle travels", the result of the determination is negative, and thus the process proceeds to S202.

In S202, the rule searcher 24 substitutes the "number of person's steps" in the input physical quantity C1, and substitutes "step" in the input unit T1. Thereafter, the first procedure ends, and the process proceeds to S132 in the conversion processing.

After the result of the determination in S132 becomes negative, "0" is substituted in the row number m in S134, and then the process returns to S104. In S104, the physical-quantity conversion table 32 is searched for a conversion rule in which the conversion-source physical quantity is the "number of person's steps" and the conversion-source unit is the "step".

Since there is no corresponding conversion rule, the result of the determination in S106 is negative. Thus, in S118, a conversion rule in which the conversion-target physical quantity is the "number of person's steps" and the conversion-target unit is the "step" is searched for.

Although the conversion rule stored in the fourth row (ID=4) is extracted as a result of the search in S118, the conversion-source physical quantity (energy) is a physical quantity into which a conversion has been performed in a past conversion. Thus, the result of the determination in S122 is affirmative, and the process proceeds to S124 in which the search is continued. In this case, since there is no corresponding row, the result of the determination in S120 is negative, and the process proceeds to S136.

In S136, "4" is substituted in the variable t. In addition, "24" is substituted in the conversion result R.

In S140, "4" is substituted in m. In S142, since the current input physical quantity C1 is the "number of person's steps", the conversion-source physical quantity "energy" within the conversion rule in the fourth row (ID=4) in the physical-quantity conversion table 32 is substituted in the input physical quantity C1. In addition, the conversion source input unit "kcal" is substituted in the unit T1. Thereafter, the process returns to S104.

At this case, m+1=5 is obtained. Since the physical-quantity conversion table 32 has rows up to only the fourth row, the process reaches S136 again, and "2" is substituted in the variable t in S136. In addition, "6" is substituted in the conversion result R. In S140, "2" is substituted in the row number m. In S142, since the current input physical quantity C1 is "energy", the conversion-source physical quantity "amount of gasoline burned" within the conversion rule in the second row (ID=2) in the physical-quantity conversion table 32 is substituted in the input physical quantity C1. In addition, the conversion-source unit "l" is substituted in the input unit T1. Thereafter, the process returns to S104.

In S104, since m+1=3 is obtained, the search is started from the third row. There is no conversion rule in which the conversion-source physical quantity is the "amount of gasoline burned". However, the conversion rule stored in the third row (ID=3) is a rule in which the conversion-target physical quantity is the "amount of gasoline burned" and the unit is the "l", and thus the result of the determination in S120 is affirmative.

The row number "3" is registered on Stack_A in S126, and the reverse conversion of a conversion according to the conversion rule stored in the third row (ID=3) is applied in S128 to perform a calculation. When the reverse conversion of a conversion according to the conversion rule with ID=3 is applied, the amount of gasoline burned, 6 l, is divided by a coefficient "0.05" and is thus converted into a distance a vehicle travels, 120 km (6/0.05=120). Thus, "120" is registered on Stack_B as the conversion result R.

In S250 in the second procedure (see FIG. 10) of S130, the conversion-source physical quantity within the conversion rule with ID=3 is the "distance a vehicle travels", and the output physical quantity C2 is the "distance a vehicle travels", and thus the result of the determination is affirmative. Therefore, the process proceeds to S254.

In S254, the output unit 30 outputs "120" and "km" to the terminal apparatus 14 as the conversion result R and the output unit, respectively. Thereafter, the second procedure ends, and the process proceeds to S132 in the conversion processing. The result of the determination in S132 is affirmative, and the conversion processing ends.

Second Embodiment

According to the first embodiment described above, a conversion rule in which a conversion-source physical quantity or conversion-target physical quantity and the unit thereof match the input physical quantity and the unit thereof is applied to convert the physical quantity. In contrast, according to a second embodiment, even when the unit of an input physical quantity differs from the unit of the physical quantity in a conversion rule, the conversion rule is applied through conversion of the unit of the physical quantity to thereby convert the physical quantity. In the description of the second embodiment provided below, portions that are the same as or similar to those in the first embodiment are denoted by the same reference numerals, and descriptions thereof are not given.

Figure 11:
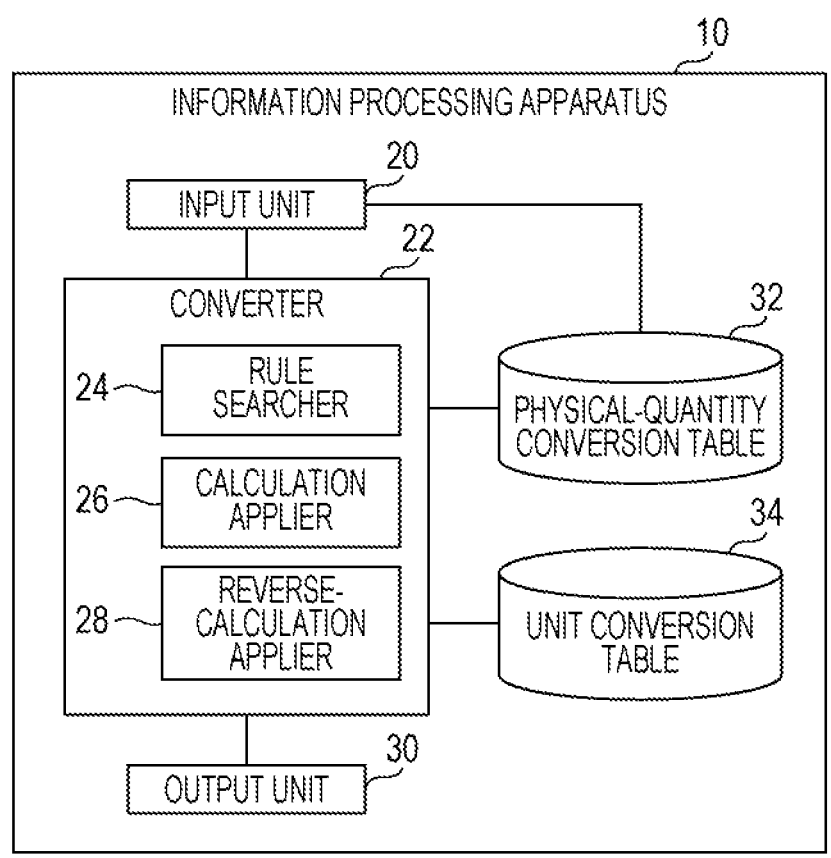
FIG. 11 is a diagram illustrating an exemplary configuration of an information processing apparatus according to a second embodiment.
Figure 13:
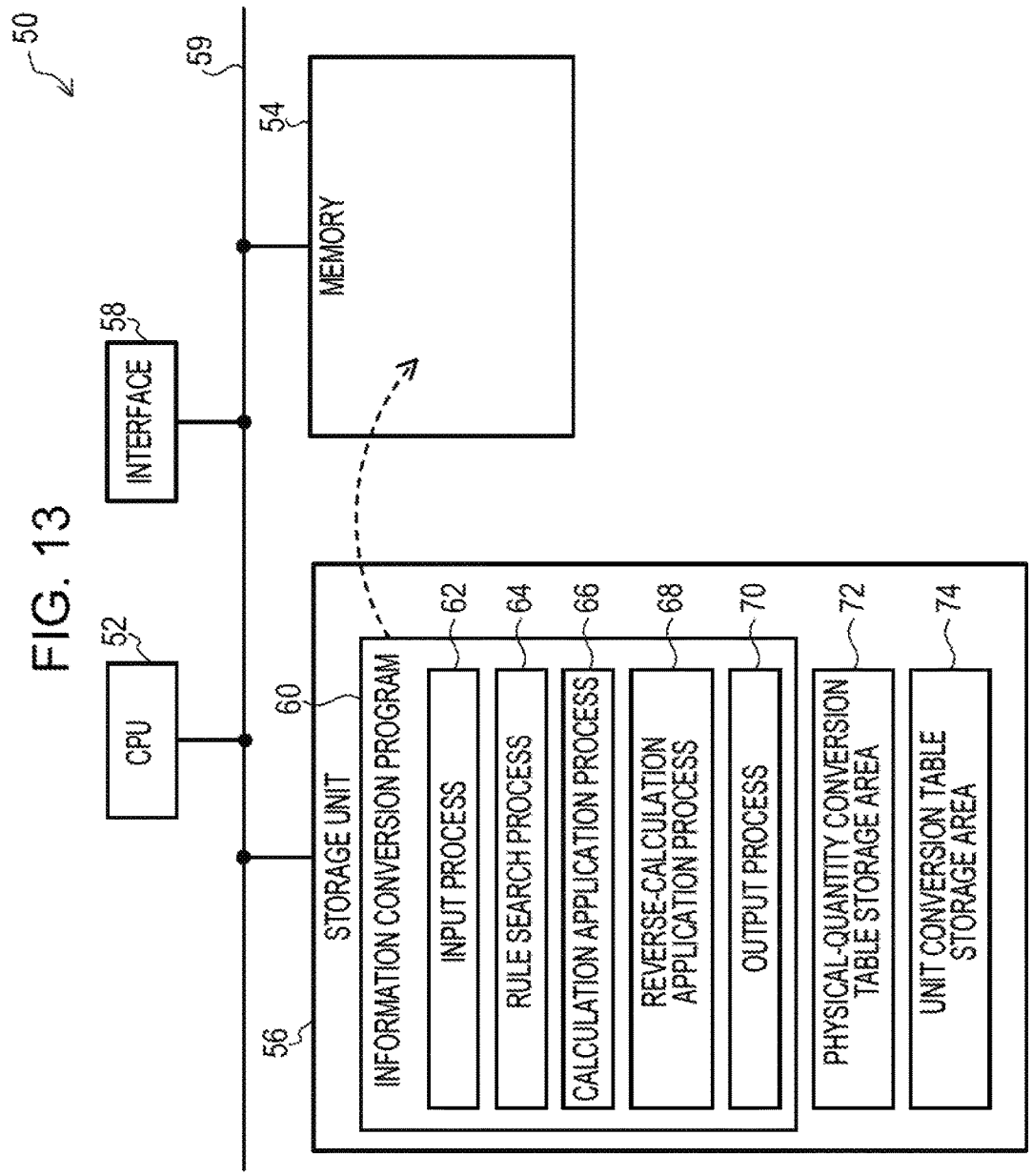
FIG. 13 is a diagram illustrating a configuration of a computer that serves as the information processing apparatus according to the second embodiment.

As illustrated in FIG. 11, the information processing apparatus 10 according to the second embodiment differs from the information processing apparatus 10 according to the first embodiment in that a unit conversion table 34 is stored in a predetermined storage area (see a unit conversion table storage area 74 in FIG. 13).

As in a specific example illustrated in FIG. 12, the unit conversion table 34 stores therein basic-unit conversion rules which are definitions for converting conversion-source units into conversion-target units.

Specifically, as illustrated in FIG. 12, one basic-unit conversion rule includes a conversion-source unit, a coefficient, a calculation method ("calculation" in FIG. 12), and a conversion-target unit. A basic-unit conversion rule with ID=K1 illustrated in FIG. 12 indicates that a value "1 kcal" in the unit "kcal" is converted into 1000 cal (1×1000=1000) in the unit "cal".

When converting a physical quantity by applying a conversion rule, the calculation applier 26 and the reverse-calculation applier 28 according to the second embodiment convert the unit of the physical quantity by applying a basic-unit conversion rule. As a result, according to the second embodiment, a conversion rule including a physical quantity with a different unit may be applied.

The information processing apparatus 10 according to the second embodiment may be implemented by, for example, a computer 50 illustrated in FIG. 13. The computer 50 illustrated in FIG. 13 according to the second embodiment differs from the computer 50 according to the first embodiment in that the storage unit 56 has the unit conversion table storage area 74. The unit conversion table 34 is stored in the unit conversion table storage area 74.

Next, a description will be given of behaviors of the information processing apparatus 10 according to the second embodiment.

A plurality of basic-unit conversion rules are pre-stored in the unit conversion table 34 in the information processing apparatus 10 according to the second embodiment. A method for storing the basic-unit conversion rules is not particularly limited, and the basic-unit conversion rules may be manually stored in the physical-quantity conversion table 32 in advance. The basic-unit conversion rules may also be collected from any of the data servers 12, as in the method (the conversion-rule storage processing, see FIG. 5) for storing the conversion rules in the physical-quantity conversion table 32 described above in the first embodiment.

Figure 14A:
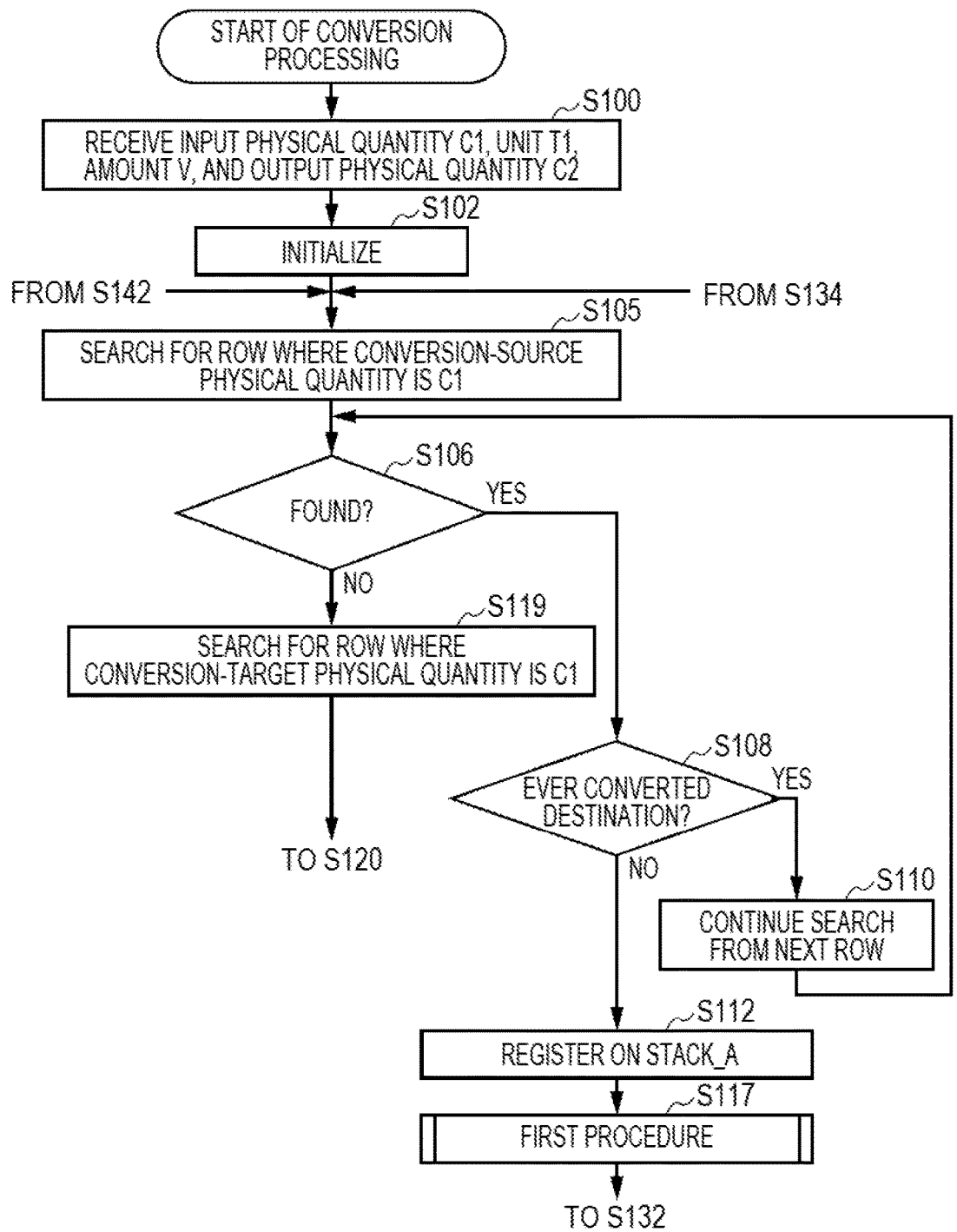
FIGS. 14A and 14B are flowcharts of an example of conversion processing performed by the information processing apparatus according to the second embodiment.
Figure 14B:
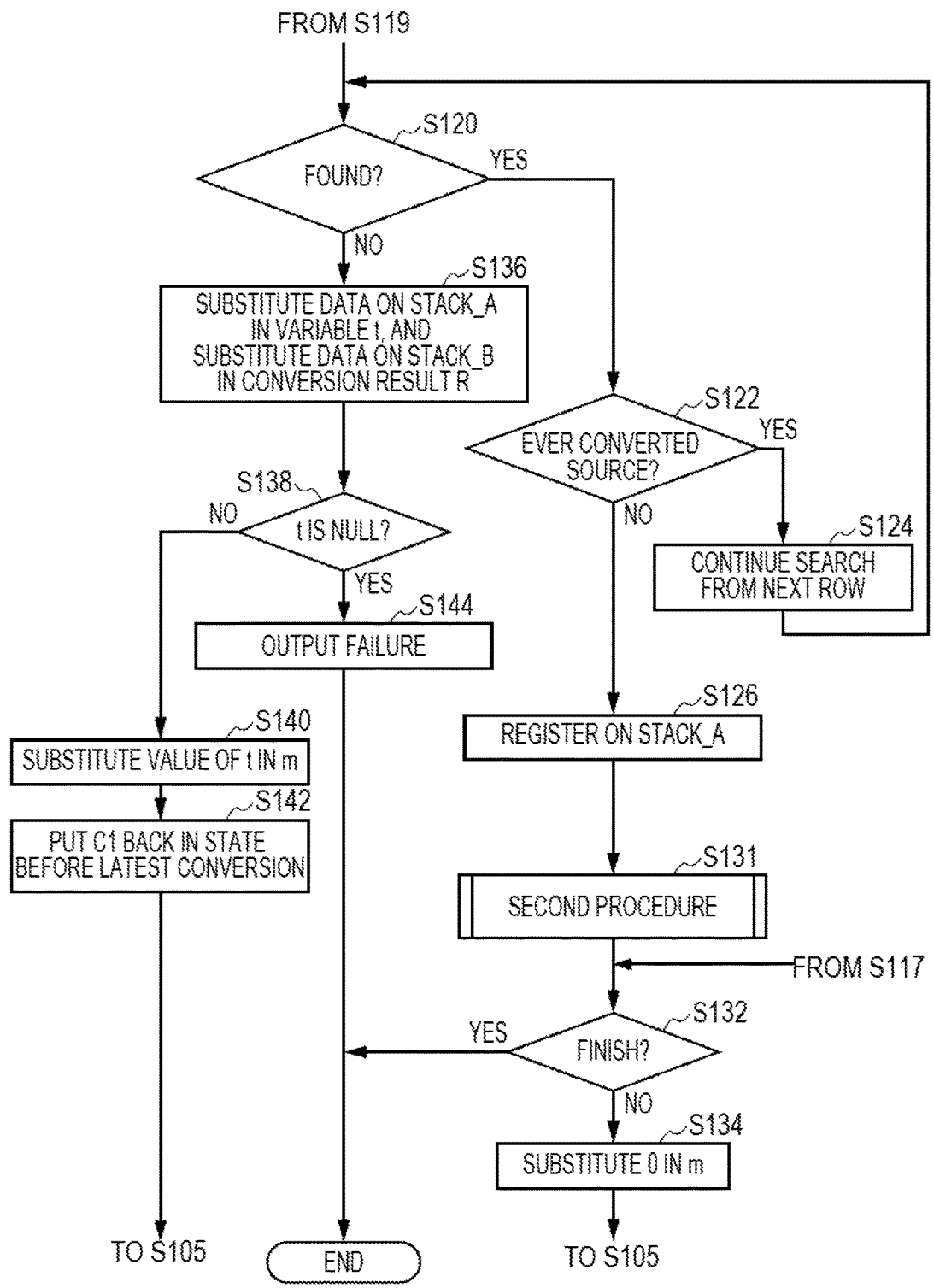

With respect to conversion processing performed by the information processing apparatus 10 according to the second embodiment, a description will be given of portions that are different from those in the conversion processing (see FIGS. 7A and 7B) according to the first embodiment. The conversion processing according to the second embodiment illustrated in FIGS. 14A and 14B differs from the conversion processing (see FIGS. 7A and 7B) according to the first embodiment in that S105 and S119 are performed instead of S104 and S118, respectively. The conversion processing according to the second embodiment further differs from the conversion processing according to the first embodiment in that the first procedure in S117 is performed after S112 without performing S114. In addition, the conversion processing according to the second embodiment differs from the conversion processing according to the first embodiment in that the second procedure in S131 is performed after S126 without performing S128.

In S105, the rule searcher 24 searches, starting from the (m+1)-th row, the physical-quantity conversion table 32 for a conversion rule in which the conversion-source physical quantity is the input physical quantity C1.

Figure 15:
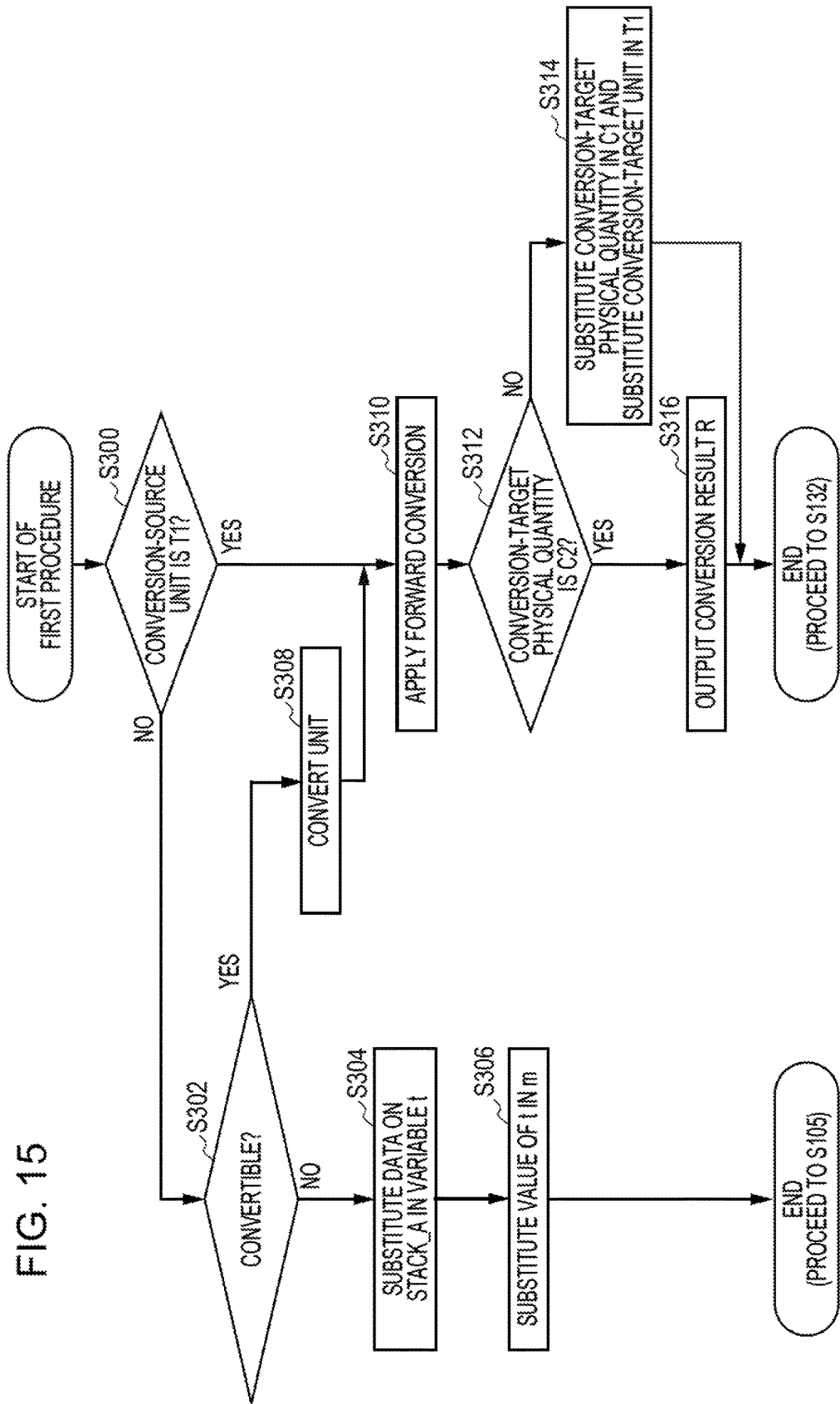
FIG. 15 is a flowchart of an example of a first procedure in the conversion processing according to the second embodiment.

As illustrated in FIG. 15, the first procedure according to the second embodiment performed in S117 differs from the first procedure (see FIG. 9) according to the first embodiment.

In S300, the rule searcher 24 determines whether or not the unit of the conversion-source physical quantity within the conversion rule extracted in the search is the input unit T1. If the unit of the conversion-source physical quantity is not the input unit T1, the result of the determination is negative, and the process proceeds to S302.

In S302, the rule searcher 24 determines whether or not the input unit T1 is convertible into the conversion-source unit within the extracted conversion rule by using the basic-unit conversion rules. A method for determining whether or not the input unit T1 is convertible into the conversion-source unit is not particularly limited.

For example, search may be performed to check whether or not a basic-unit conversion rule including both the input unit T1 and the conversion-source unit within the extracted conversion rule exists in the unit conversion table 34. In this case, if there is a corresponding basic-unit conversion rule, the input unit T1 is determined to be convertible, and thus the result of the determination is affirmative. If the result is affirmative, the process proceeds to S308. In S308, the calculation applier 26 or the reverse-calculation applier 28 converts the value of the input unit T1 into the value of the conversion-source unit, and then the process proceeds to S310.

More specifically, when a calculation is performed by directly applying any of the basic-unit conversion rules, the calculation applier 26 converts the value (the amount thereof is the conversion result R) of the physical quantity in the input unit T1 into the value of the same physical quantity in the conversion-source unit within the extracted conversion rule. When a calculation is performed by applying the reverse calculation of a calculation according to any of the basic-unit conversion rules, the reverse-calculation applier 28 converts the value (the amount thereof is the conversion result R) of the physical quantity in the input unit T1 into the value of the same physical quantity in the conversion-target unit within the extracted conversion rule. In either case, the result of the conversion is substituted in the conversion result R.

If the result of the determination in S300 is affirmative, the process also proceeds to S310.

In S310, the calculation applier 26 applies the forward conversion of the conversion rule to the conversion result R to convert the value of the input physical quantity C1, as in S114 in the conversion processing (see FIGS. 7A and 7B) according to the first embodiment. The calculation applier 26 substitutes a result of the conversion in the conversion result R and registers the conversion result R on Stack_B.

Since S312 to S316 are the same as or similar to S200 to S204 of the first procedure (see FIG. 9) according to the first embodiment, descriptions thereof are not given.

If the result of the determination in S302 is negative, the process proceeds to S304.

In S304, the rule searcher 24 substitutes the data (row number) popped from Stack_A in the variable t. In S306, the rule searcher 24 substitutes the value of the variable t in the row number m. Thereafter, the first procedure ends, and the process proceeds to S105 in the conversion processing. That is, when the conversion of the input unit T1 into the conversion-source unit within the extracted conversion rule fails using the basic-unit conversion rules stored in the unit conversion table 34, the conversion rule extracted in the search is not applicable, and thus the search of a conversion rule is resumed.

In S119, the rule searcher 24 searches for, starting from the (m+1)-th row of the physical-quantity conversion table 32, a conversion rule in which the conversion-target physical quantity is the input physical quantity C1.

Figure 16:
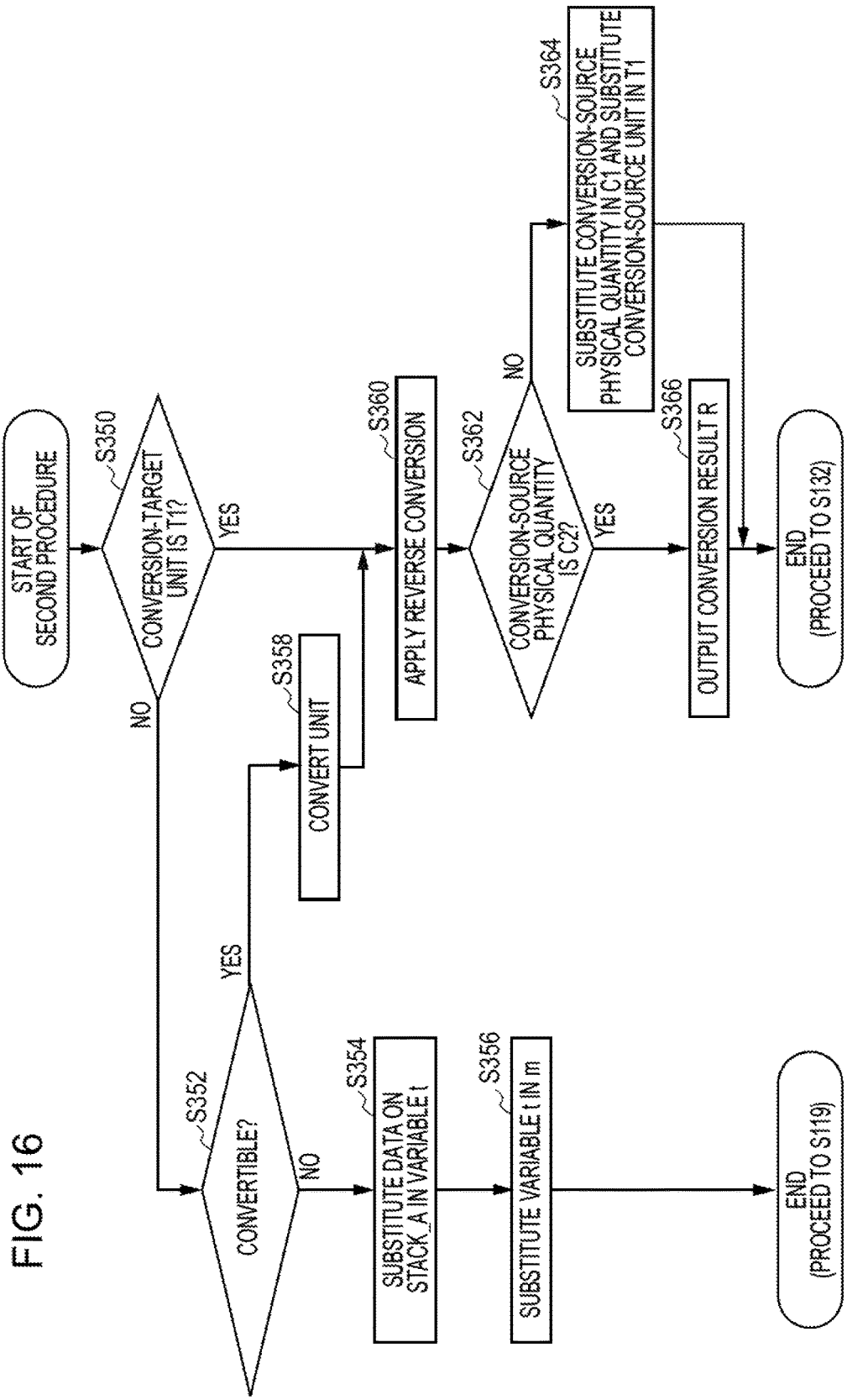
FIG. 16 is a flowchart of an example of a second procedure in the conversion processing according to the second embodiment.

The second procedure according to the second embodiment performed in S131 differs from the second procedure (see FIG. 10) according to the first embodiment, as illustrated in FIG. 16.

In S350, the rule searcher 24 determines whether or not the unit of the conversion-target physical quantity within the conversion rule extracted in the search is the input unit T1. If the unit of the conversion-target physical quantity is not the input unit T1, the result of the determination is negative, and the process proceeds to S352.

In S352, the rule searcher 24 determines whether or not the input unit T1 is convertible into the conversion-target unit within the extracted conversion rule by using the basic-unit conversion rules. A method for determining whether or not the input unit T1 is convertible into the conversion-target unit is not particularly limited. The determination may be made in the same manner as in S302 in the above-described first procedure (see FIGS. 14A and 14B). If the result of the determination is affirmative, the process proceeds to S358. In S358, the calculation applier 26 or the reverse-calculation applier 28 converts the value of the input unit T1 into the value of the conversion-target unit, and then the process proceeds to S360. A method for the conversion may be analogous to the method used in S308 in the first procedure (see FIGS. 14A and 14B) described above.

If the result of the determination in S350 is affirmative, the process also proceeds to S360.

In S360, the reverse-calculation applier 28 applies the reverse conversion of a conversion according to the conversion rule to the conversion result R to convert the value of the input physical quantity C1, as in S128 in the conversion processing (see FIGS. 7A and 7B) according to the first embodiment. The reverse-calculation applier 28 substitutes a result of the conversion in the conversion result R and registers the conversion result R on Stack_B.

Since S362 to S366 are the same as or similar to S250 to S254 of the second procedure (see FIG. 10) according to the first embodiment, descriptions thereof are not given.

If the result of the determination in S352 is negative, the process proceeds to S354.

In S354, the rule searcher 24 substitutes the data (row number) popped from Stack_A in the variable t. In S356, the rule searcher 24 substitutes the value of the variable t in the row number m. Thereafter, the second procedure ends, and the process proceeds to S119 in the conversion processing. That is, when the conversion of the input unit T1 into the conversion-target unit within the extracted conversion rule fails using the basic-unit conversion rules stored in the unit conversion table 34, the conversion rule extracted in the search is not applicable, and thus the search of a conversion rule is resumed.

A case in which the information processing apparatus 10 has a physical-quantity conversion table 32 illustrated in FIG. 17 will be further described as a specific example. The physical-quantity conversion table 32 illustrated in FIG. 17 differs from the physical-quantity conversion table 32 (see FIG. 3) described in the first embodiment as a specific example in that the unit for conversion in the conversion rule ID=4 is "cal" in the second embodiment.

A description will be given of conversion processing when an instruction for converting the "amount of $CO_2$ generated, 2 t" into the "distance a vehicle travels" is received from the terminal apparatus 14, as in the conversion processing described in the first embodiment as a specific example.

When the conversion processing is performed, the conversion rule in the fourth row (ID=4) is extracted as a result of the search in S105, as in the first embodiment. Thus, in S112, the row number "4" is registered on Stack_A. In S300 in the first procedure (see FIG. 15) of S117, the conversion-source unit within the conversion rule with ID=4 is "cal", and the input unit T1 is "kcal", thus the result of the determination is negative, and the process proceeds to S302.

Since the input unit T1 is convertible using the basic-unit conversion rule with ID=K1 in the unit conversion table 34, the result of the determination in S302 is affirmative, and the process proceeds to S308.

In S308, the calculation applier 26 applies the basic-unit conversion rule with ID=K1 to convert the value in the input unit T1 "kcal" into a value in "cal", which is the original conversion-source unit within the extracted conversion rule. Specifically, since the unit conversion is performed by multiplying the value of the physical quantity by 1000, the unit T1 of the input physical quantity is converted into "cal", and the amount is converted into 24000.

Accordingly, in S310, the conversion rule with ID=4 is applied to an energy of 24000 cal to perform a calculation, to thereby convert the amount into the number of person's steps, 12 (24000×0.0005=12). Thus, "12" is registered on Stack_B as the conversion result R.

As in the case in which the conversion rule for the physical quantity is stored on Stack_A, it is preferable that the applied basic-unit conversion rule be stored on a stack or the like. In this case, it is preferable to store information indicating whether the basic-unit conversion rule is to be applied as a forward conversion or is to be applied as a reverse conversion.

As described above, in the information processing apparatus 10 according to each embodiment described above, the input unit 20 receives an input physical quantity, the value of the input physical quantity, and an output physical quantity. Rules for conversion between different physical quantities are stored in the physical-quantity conversion table 32. The converter 22 generates an array of conversion operations for conversion from the input physical quantity into the output physical quantity. Each conversion operation is a conversion according to one conversion rule or a reverse conversion of a conversion according to the one conversion rule. By using the generated array of conversion operations, the converter 22 converts the value of the input physical quantity into a value of the output physical quantity.

As described above, the information processing apparatus 10 according to each embodiment described above may convert the input physical quantity C1 into the output physical quantity C2, by applying the forward conversion or the reverse conversion of a conversion according to each of the conversion rules stored in the physical-quantity conversion table 32. Thus, even when there is no conversion rule for directly converting the input physical quantity C1 into the output physical quantity C2, it is possible to perform the physical-quantity conversion. It is also possible to perform a physical-quantity conversion that is not achievable by simply combining a plurality of conversion rules, for example, by performing only a forward conversion.

Thus, the information processing apparatus 10 according to each embodiment described above may convert the value of the input physical quantity C1 received from the terminal apparatus 14 into a value of the output physical quantity C2 even when a conversion rule for a corresponding physical quantity does not exist. Thus, the information processing apparatus 10 according to each embodiment described above may perform conversion into various physical quantities desired by a user.

Also, the information processing apparatus 10 according to each embodiment described above does not need to store both a conversion rule for a forward conversion and a conversion rule for a reverse conversion in the physical-quantity conversion table 32 as conversion rules between one physical quantity and another physical quantity. Thus, the information processing apparatus 10 according to each embodiment described above may reduce the capacity of a storage unit (for example, a memory) used to store the physical-quantity conversion table 32.

Figure 18A:
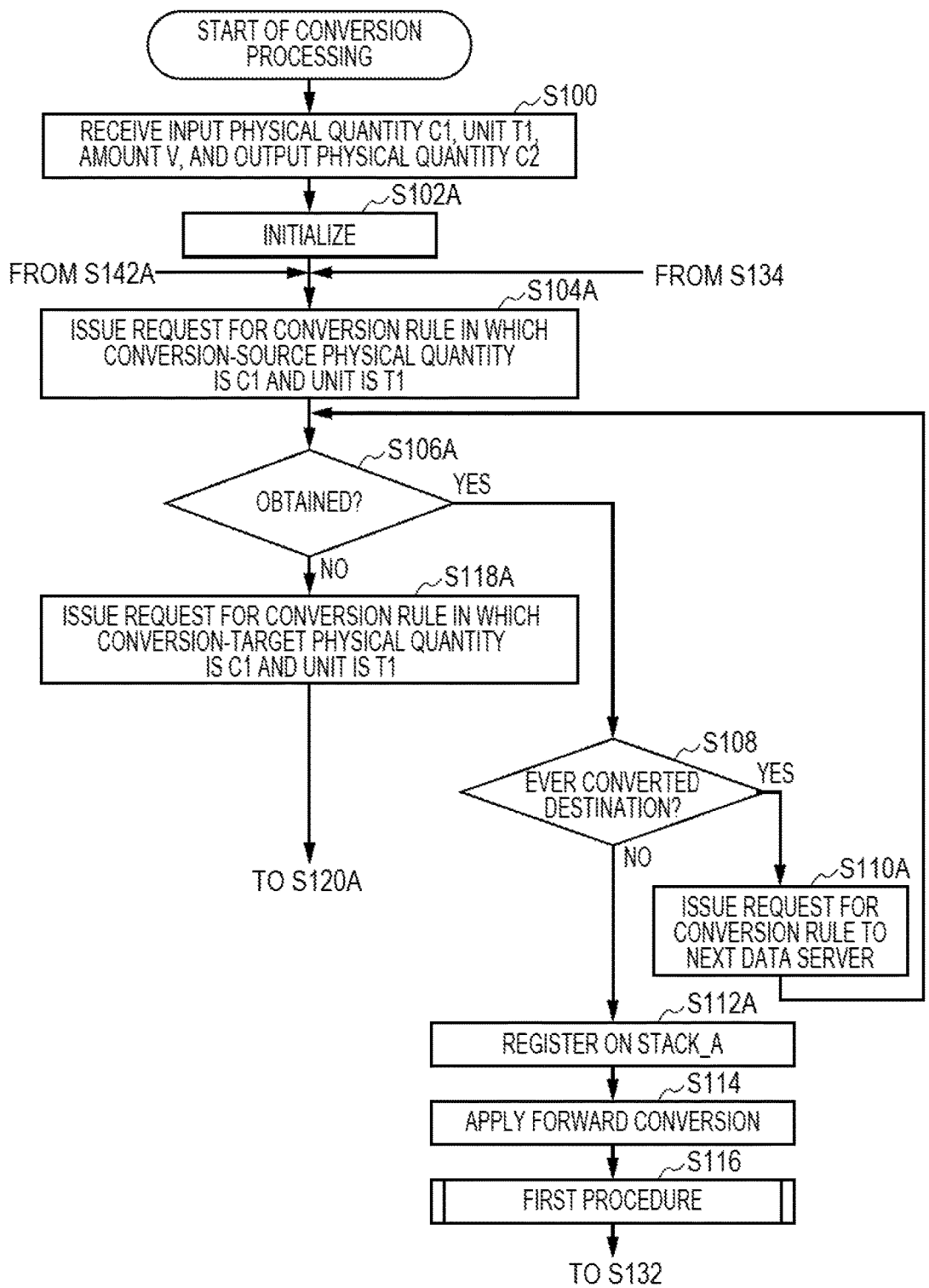
FIGS. 18A and 18B are flowcharts of an example of conversion processing performed by the information processing apparatus.
Figure 18B:
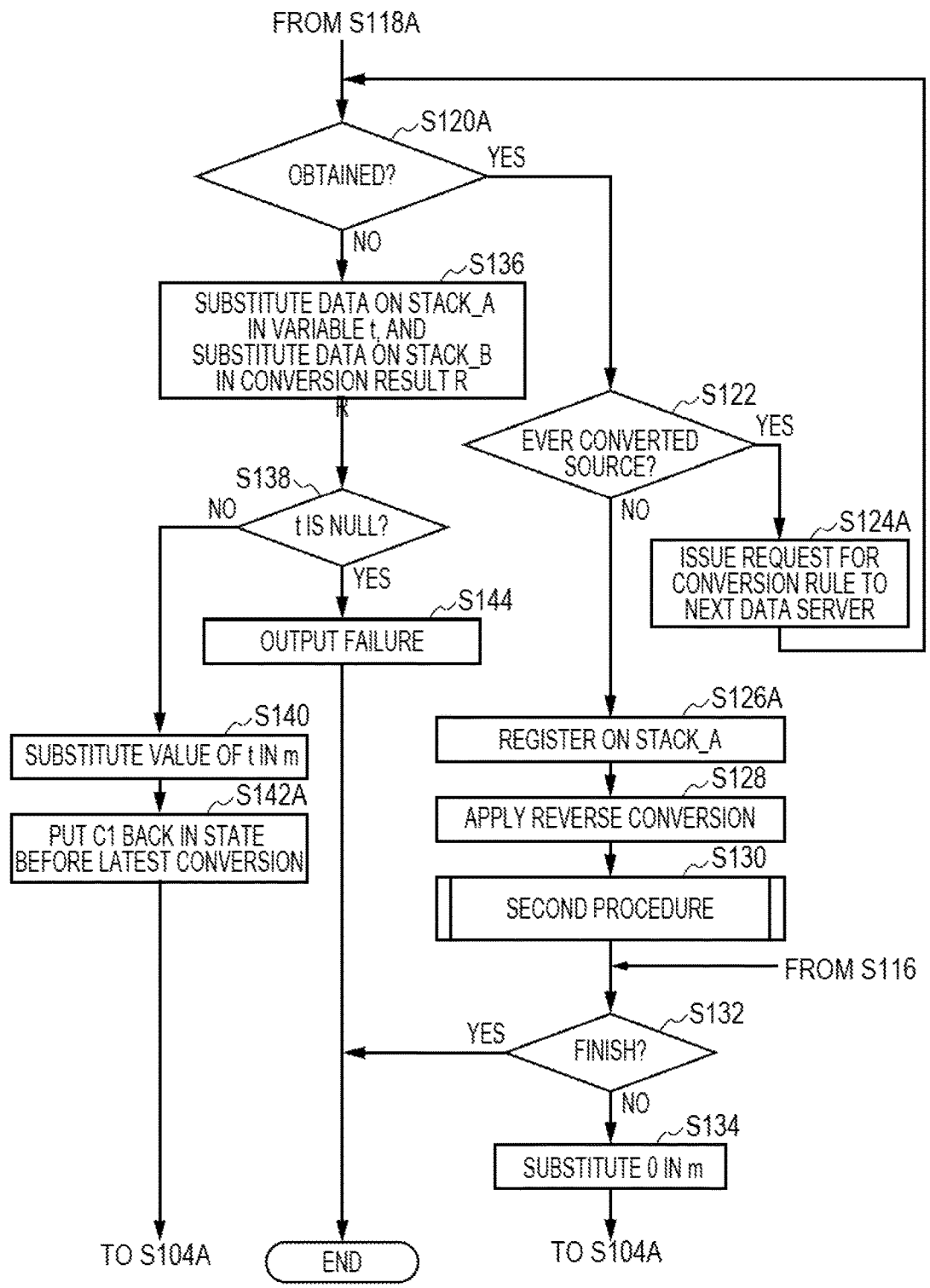

Although a case in which the conversion rules are stored in the physical-quantity conversion table 32 through the storage processing illustrated in FIG. 5 before the conversion processing is performed has been described in each embodiment described above, each conversion rule may be obtained from the data server 12 during execution of the conversion processing, as appropriate. In this case, for example, the conversion processing illustrated in FIGS. 18A and 18B is performed without performing the storage processing. The information processing apparatus 10 pre-holds a list of addresses of the data servers 12 to which a request for a conversion rule may be issued.

In the conversion processing illustrated in FIGS. 18A and 18B, a request for a conversion rule is issued to the data server 12 in order of the list of the addresses, instead of search for the conversion rule in the physical-quantity conversion table 32 in the conversion processing (see FIGS. 7A and 7B) according to the first embodiment. Thus, in the conversion processing illustrated in FIGS. 18A and 18B, the variable "m", which represents the row number of the physical-quantity conversion table 32 in the first embodiment, is used as a number of each data server 12 in the list of the addresses.

Since the conversion processing illustrated in FIGS. 18A and 18B includes processes that are analogous to those in the conversion processing (see FIGS. 7A and 7B) according to the first embodiment, only different processes will be described.

In S102A, the rule searcher 24 initializes the conversion result R, Stack_A, and Stack_B. In addition, the rule searcher 24 initializes the number m indicating an order in the list of the addresses to "0".

Figure 19:
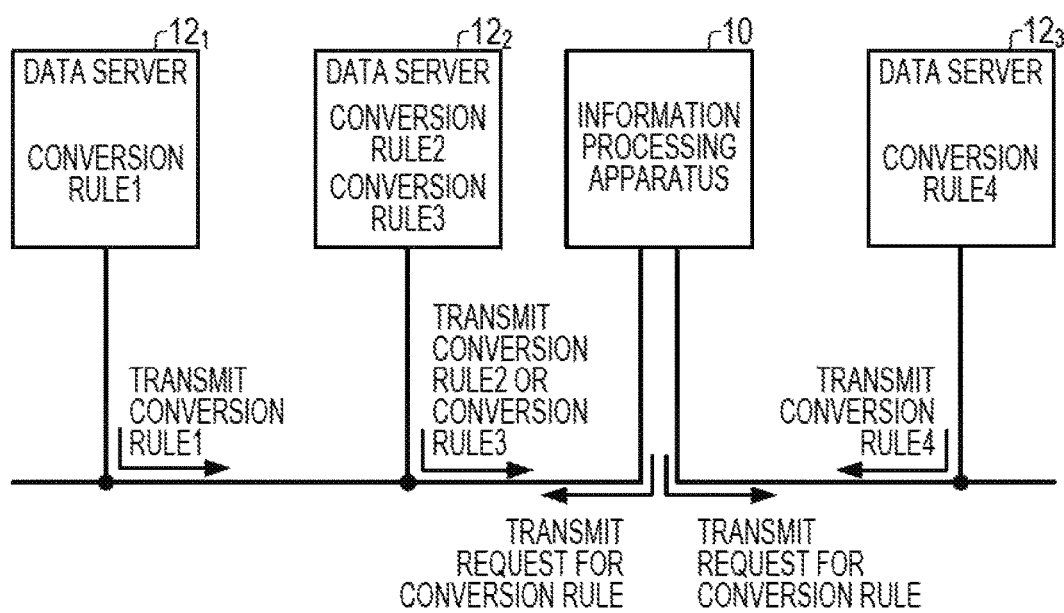
FIG. 19 is a diagram illustrating transmitting a request for a conversion rule and obtaining the conversion rule in the conversion processing illustrated in FIGS. 18A and 18B.

In S104A, the rule searcher 24 sequentially issues, to the data servers 12 starting from the (m+1)-th data server 12 in the list of the addresses, a request for a conversion rule in which the conversion-source physical quantity is the input physical quantity C1 and the conversion-source unit is the input unit T1, as illustrated in FIG. 19.

In S106A, the rule searcher 24 determines whether or not a conversion rule is obtained. When a conversion rule is received from the data server 12 to which the request for the conversion rule has been issued, the result of the determination is affirmative, and the process proceeds to S108.

If the result of the determination in S108 is affirmative, the process proceeds to S110A in which the rule searcher 24 sequentially issues a request for a conversion rule to the data servers 12 starting from the next data server 12 (that is, the data server 12 corresponding to the next number in the list). If the result of the determination in S108 is negative, the process proceeds to S112A in which the number of the data server 12 from which the conversion rule has been obtained is registered on Stack_A. When the conversion processing illustrated in FIGS. 18A and 18B is performed, an ID is assigned to the obtained conversion rule, and the conversion rule is stored in the physical-quantity conversion table 32. As a result, the physical-quantity conversion table 32, which is analogous to that in each embodiment described above, is stored in the information processing apparatus 10.

If the result of the determination in S106A is negative, the process proceeds to S118A. In S118A, the rule searcher 24 sequentially issues, to the data servers 12 starting from the (m+1)-th data server 12 in the list of the addresses, a request for a conversion rule in which the conversion-target physical quantity is the input physical quantity C1 and the conversion-target unit is the input unit T1, as illustrated in FIG. 19.

In S120A, the rule searcher 24 determines whether or not a conversion rule is obtained. When a conversion rule is obtained from the data server 12 to which the request for the conversion rule has been issued, the result of the determination is affirmative, and the process proceeds to S122.

If the result of the determination in S122 is affirmative, the process proceeds to S124A in which the rule searcher 24 sequentially issues a request for a conversion rule to the next data server 12 (that is, the data server 12 corresponding to the next number in the list), as in S110A described above. If the result of the determination in S122 is negative, the process proceeds to S126A in which the number of the data server 12 from which the conversion rule has been obtained is registered on Stack_A, as in S112A described above.

If the result of the determination in S120A is negative, the process proceeds to S136.

In S142A, the rule searcher 24 substitutes, in the input physical quantity C1, the physical quantity within the conversion rule obtained from the data server 12 corresponding to the number m in the list of the addresses and different from the current input physical quantity C1.

As described above, the conversion processing illustrated in FIGS. 18A and 18B is performed to thereby obtain a conversion rule from the data server 12 during execution of the conversion processing. Thus, it is possible to apply a newer conversion rule to conversion of a physical quantity.

Although, in each embodiment described above, a forward conversion or a reverse conversion is performed each time a conversion rule that is applicable to conversion of the input physical quantity C1 and the input unit T1 is extracted (obtained), the timing at which the forward conversion or the reverse conversion is performed is not limited thereto. For example, after all applicable conversion rules are extracted, at least one of the forward conversion or the reverse conversion may be performed. After the above-described conversion processing is finished, all conversion rules to be applied to conversion of the input physical quantity C1 received from the terminal apparatus 14 into the output physical quantity C2 are stored on Stack_A. Thus, by sequentially applying the conversion rules on the basis of the row number m in the physical-quantity conversion table 32 stored on Stack_A and the information indicating a forward conversion or a reverse conversion, it is possible to convert the input physical quantity C1 into the output physical quantity C2.

Although a case in which conversion rules are obtained from the data servers 12 and stored in the physical-quantity conversion table 32 has been described above in each embodiment, the source from which the conversion rules are obtained is not limited to the data servers 12. For example, the physical-quantity conversion table 32 in which a plurality of conversion rules are stored may be pre-stored in the information processing apparatus 10. However, it is preferable that conversion rules be obtained from the data servers 12, as in each embodiment described above.

In this case, even for companies, standardization institutes, and so on that are not much associated with each other, for example, because of different business types or the like, it is sufficient that servers in the companies, the standardization institutes, and so on serve as the data servers 12 to provide only conversion rules for physical quantities that are relevant to the corresponding entities. It is difficult for the information processing apparatus that performs physical-quantity conversion to hold and manage all conversion rules. However, according to the information processing apparatus 10 in each embodiment described above, the information processing apparatus 10 may or may not hold and manage all conversion rules.

Also, when servers at the companies and standardization institutes, and so on serve as the data servers 12, obtaining updated conversion rules in the data servers 12 makes it possible to convert a physical quantity by using the most recent rules. For example, since the vehicle fuel efficiency is improving, a conversion rule in which the vehicle fuel efficiency is a physical quantity is also updated. Since the data server 12, which provides a vehicle fuel efficiency, updates a conversion rule, the information processing apparatus 10 according to each embodiment described above may convert a physical quantity by applying a most recent conversion rule without updating the conversion rule in the information processing apparatus 10. Thus, the information processing apparatus 10 according to each embodiment described above may reduce the amount of work for updating the conversion rules.

When a conversion rule is obtained from the data server 12, there is a case in which the reliability of the conversion rule may vary depending on the data server 12 or the like. Accordingly, it is preferable that information regarding the reliability of each data server 12 be also stored in the list of the addresses of the data servers 12. When conversion rules in which conversion-source physical quantities are the same and conversion-target physical quantities are the same are obtained from different data servers 12, the accuracy of the physical-quantity conversion may be enhanced by applying the conversion rule obtained from the data server 12 having a high reliability. A method in which the information processing apparatus 10 determines the reliability is not particularly limited. For example, it may be determined that a conversion rule that is stored in the data server 12 at later date and time has a higher reliability. The reliability may also be determined depending on a company, a standardization institute, or the like that provides the data server 12.

The description in each embodiment has been given of a mode in which a conversion rule including the input physical quantity C1 is searched for and an array of conversion operations for conversion from the input physical quantity C1 into the output physical quantity C2 is generated. However, a conversion rule including the output physical quantity C2 may be searched for, and an array of conversion operations for conversion from the output physical quantity C2 into the input physical quantity C1 may be generated.

The above description has been given of a state in which the information conversion program 60 is pre-stored (installed) in the storage unit 56 of the computer 50. The information conversion program 60, however, may be provided in a form in which it is recorded on/in a storage medium. Examples of the storage medium include a compact disc read-only memory (CD-ROM), a digital versatile disk read-only memory (DVD-ROM), and a Universal Serial Bus (USB) memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information conversion method, comprising:
   storing, by a computer, conversion rules in a memory, each of the conversion rules converting a value of a source physical quantity into a value of a target physical quantity;
   receiving, by the computer, an input physical quantity, a value of the input physical quantity, and an output physical quantity;
   determining, by the computer, whether a first conversion rule is included in the conversion rules, a source physical quantity of the first conversion rule being identical to the received input physical quantity, a target physical quantity of the first conversion rule being identical to the received output physical quantity;
   determining, by the computer, a sequence of second conversion rules based on the conversion rules when the first conversion rule is not included in the conversion rules, each of the second conversion rules being any one of the conversion rules or a reverse of any one of the conversion rules, the determined sequence of the second conversion rules starting with the input physical quantity and ending with the output physical quantity, a target physical quantity of each conversion rule in the sequence of second conversion rules being identical to a source physical quantity of a next conversion rule in the sequence of second conversion rules;

converting, by the computer, the received value of the input physical quantity into a value of the output physical quantity by using the determined sequence of the second conversion rules; and outputting the value of the output physical quantity.

2. The information conversion method according to claim 1, the method comprising:

converting, when the first conversion rule is included in the conversion rules, the received value of the input physical quantity into a value of the output physical quantity using the first conversion rule.

3. The information conversion method according to claim 1, the method comprising:

converting a first value of a first physical quantity into a second value of the first physical quantity using a pre-defined unit conversion rule for converting one unit into another unit, the first value being a first amount associated with a first unit, the second value being a second amount associated with a second unit different from the first unit.

4. The information conversion method according to claim 1, wherein the conversion rules are held in external devices, and
the computer obtains the conversion rules from the external devices before the receiving, or requests the external devices after the receiving for a currently required conversion rule during the generating.

5. An information processing apparatus, comprising:
a memory; and
a processor coupled with the memory and the processor configured to:
store conversion rules in the memory, each of the conversion rules converting a value of a source physical quantity into a value of a target physical quantity;
receive an input physical quantity, a value of the input physical quantity, and an output physical quantity;
determine whether a first conversion rule is included in the conversion rules, a source physical quantity of the first conversion rule being identical to the received input physical quantity, a target physical quantity of the first conversion rule being identical to the received output physical quantity;
determine a sequence of second conversion rules based on the conversion rules when the first conversion rule is not included in the conversion rules, each of the second conversion rules being any one of the conversion rules or a reverse of any one of the conversion rules, the determined sequence of second conversion rules starting with the input physical quantity and ending with the output physical quantity, a target physical quantity of each conversion rule in the sequence of second conversion rules being identical to a source physical quantity of a next conversion rule in the sequence of second conversion rules;
convert the received value of the input physical quantity into a value of the output physical quantity by using the determined sequence of conversion rules in the generated first array and the generated second array; and
output the value of the output physical quantity.

6. The information processing apparatus according to claim 5, wherein
the processor is configured to:
convert, when the first conversion rule is included in the conversion rules, the received value of the input physical quantity into a value of the output physical quantity using the first conversion rule.

7. The information processing apparatus according to claim 5, wherein
the processor is configured to:
convert a first value of a first physical quantity into a second value of the first physical quantity using a pre-defined unit conversion rule for converting one unit into another unit, the first value being a first amount associated with a first unit, the second value being a second amount associated with a second unit different from the first unit.

8. The information processing apparatus according to claim 5, wherein
the conversion rules are held in external devices, and
the processor is configured to:
obtain the conversion rules from the external devices before the receiving, or requests the external devices after the receiving for a currently required conversion rule during the generating.

9. A non-transitory computer-readable recording medium having stored therein a program that causes a computer to execute a process, the process comprising:
storing conversion rules in a memory, each of the conversion rules converting a value of a source physical quantity into a value of a target physical quantity;
receiving an input physical quantity, a value of the input physical quantity, and an output physical quantity;
determining whether a first conversion rule is included in the conversion rules, a source physical quantity of the first conversion rule being identical to the received input physical quantity, a target physical quantity of the first conversion rule being identical to the received output physical quantity;
determining a sequence of second conversion rules based on the conversion rules when the first conversion rule is not included in the conversion rules, each of the second conversion rules being any one of the conversion rules or a reverse of any one of the conversion rules, the determined sequence of the second conversion rules starting with the input physical quantity and ending with the output physical quantity, a target physical quantity of each conversion rule in the sequence of second conversion rules being identical to a source physical quantity of a next conversion rule in the sequence of second conversion rules;
converting the received value of the input physical quantity into a value of the output physical quantity by using the determined sequence of the second conversion rules; and
outputting the value of the output physical quantity.

10. The non-transitory computer-readable recording medium according to claim 9, the process comprising:
converting, when the first conversion rule is included in the conversion rules, the received value of the input physical quantity into a value of the output physical quantity using the first conversion rule.

11. The non-transitory computer-readable recording medium according to claim 9, the process comprising:
converting a first value of a first physical quantity into a second value of the first physical quantity using a pre-defined unit conversion rule for converting one unit into another unit, the first value being a first amount associated with a first unit, the second value being a second amount associated with a second unit different from the first unit.

12. The non-transitory computer-readable recording medium according to claim 9, wherein
the conversion rules are held in external devices, and
the program causes the computer to
obtain the conversion rules from the external devices before the receiving, or requests the external devices after the receiving for a currently required conversion rule during the generating.

\* \* \* \* \*